(12) United States Patent
Gopalan

(10) Patent No.: US 10,392,931 B2
(45) Date of Patent: Aug. 27, 2019

(54) HYDRAULICALLY ASSISTED PULSER SYSTEM AND RELATED METHODS

(71) Applicant: RIME Downhole Technologies, LLC, Fort Worth, TX (US)

(72) Inventor: Manoj Gopalan, Dalworthington Gardens, TX (US)

(73) Assignee: Rime Downhole Technologies, LLC, Benbrook, TX (US)

( * ) Notice: Subject to any disclaimer, the term of this patent is extended or adjusted under 35 U.S.C. 154(b) by 0 days.

(21) Appl. No.: 15/865,611

(22) Filed: Jan. 9, 2018

(65) Prior Publication Data

US 2019/0211673 A1  Jul. 11, 2019

(51) Int. Cl.
| | | |
|---|---|---|
| *E21B 34/16* | (2006.01) | |
| *E21B 47/12* | (2012.01) | |
| *E21B 47/18* | (2012.01) | |
| *F16K 27/02* | (2006.01) | |
| *F16K 31/124* | (2006.01) | |

(52) U.S. Cl.
CPC ............ *E21B 47/187* (2013.01); *E21B 34/16* (2013.01); *E21B 47/12* (2013.01); *E21B 47/18* (2013.01); *F16K 27/02* (2013.01); *F16K 31/124* (2013.01)

(58) Field of Classification Search
CPC .......... E21B 47/12; E21B 47/14; E21B 47/18; E21B 47/182; E21B 47/185; E21B 47/187; E21B 34/16; F16K 27/02; F16K 31/124

See application file for complete search history.

(56) References Cited

U.S. PATENT DOCUMENTS

| | | | |
|---|---|---|---|
| 3,958,217 A | | 5/1976 | Spinnler |
| 5,333,686 A | | 8/1994 | Vaughan et al. |
| 5,586,084 A | * | 12/1996 | Barron ................ E21B 47/18 |
| | | | 181/102 |
| 6,016,288 A | | 1/2000 | Frith |
| 6,898,150 B2 | * | 5/2005 | Hahn .................. E21B 47/18 |
| | | | 137/269 |
| 7,057,524 B2 | * | 6/2006 | Innes .................. E21B 47/18 |
| | | | 340/855.4 |
| 7,564,741 B2 | | 7/2009 | Pratt et al. |
| 7,735,579 B2 | | 6/2010 | Gopalan et al. |
| 9,133,950 B2 | * | 9/2015 | Gopalan ............... E21B 47/182 |
| 9,453,404 B2 | * | 9/2016 | Shampine ........... E21B 47/0005 |
| 2010/0157735 A1 | | 7/2010 | Allan et al. |
| 2012/0273271 A1 | | 11/2012 | Stuart-Bruges |

* cited by examiner

*Primary Examiner* — Franklin D Balseca
(74) *Attorney, Agent, or Firm* — Timothy G. Ackermann

(57) ABSTRACT

An asynchronous top-mounted pulser system for a measurement while drilling tool uses hydraulic flow, an obstruction, a piston-balance system, and an orifice, to create pressure pulses in drilling fluid, using hydraulic pressure on an obstruction in a main pulser to assist in closing the obstruction. A valve poppet is set above (upstream of) the orifice and is pushed by fluid flow towards a closing position. The piston-balance system, connected to the poppet and located downstream of the orifice in the main pulser, responds to net pressures on the upstream and downstream sides of the piston to move the poppet. The piston also responds to a spring assembly urging the piston downstream, and tending to move the valve poppet to a closed position. A servo pulser, located downstream of the main pulser, opens and closes a rotary shear servo valve-controlled bypass flow path to control the net pressures on the piston.

30 Claims, 15 Drawing Sheets

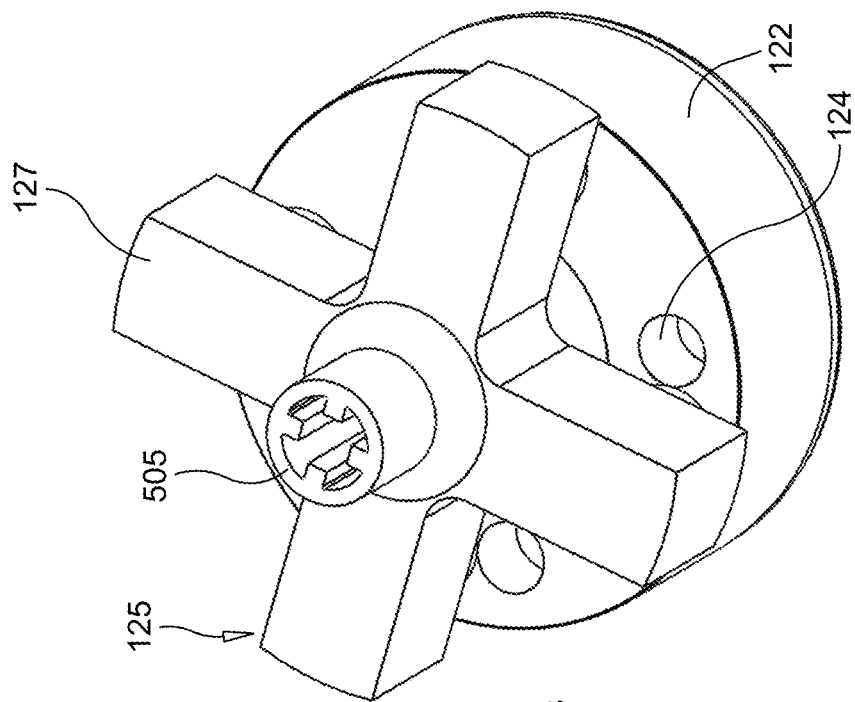
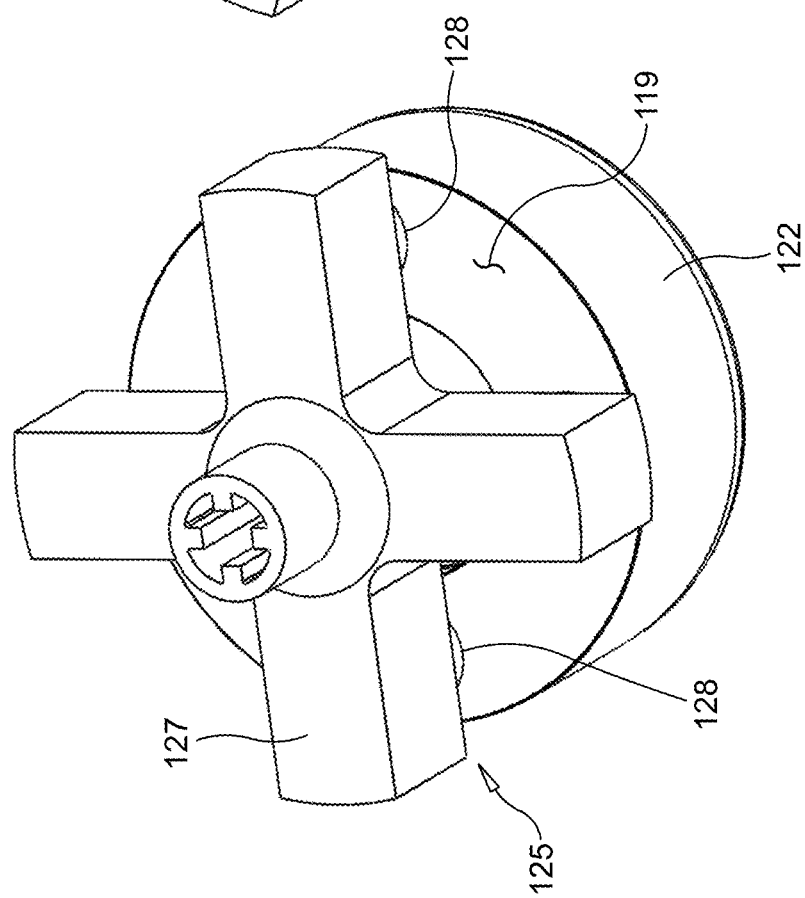

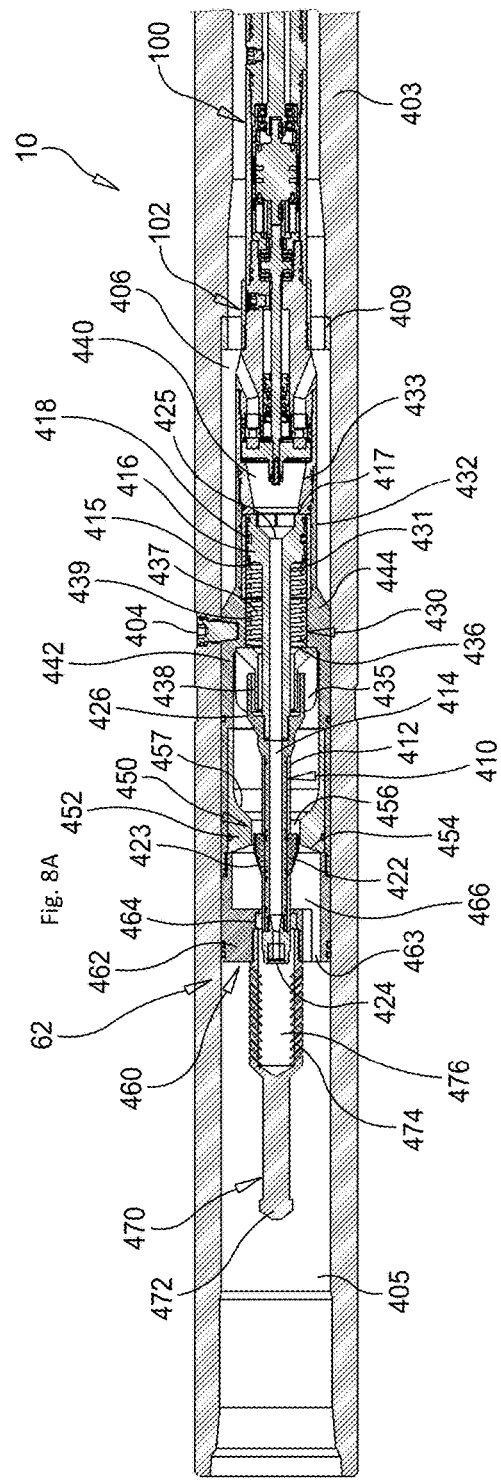

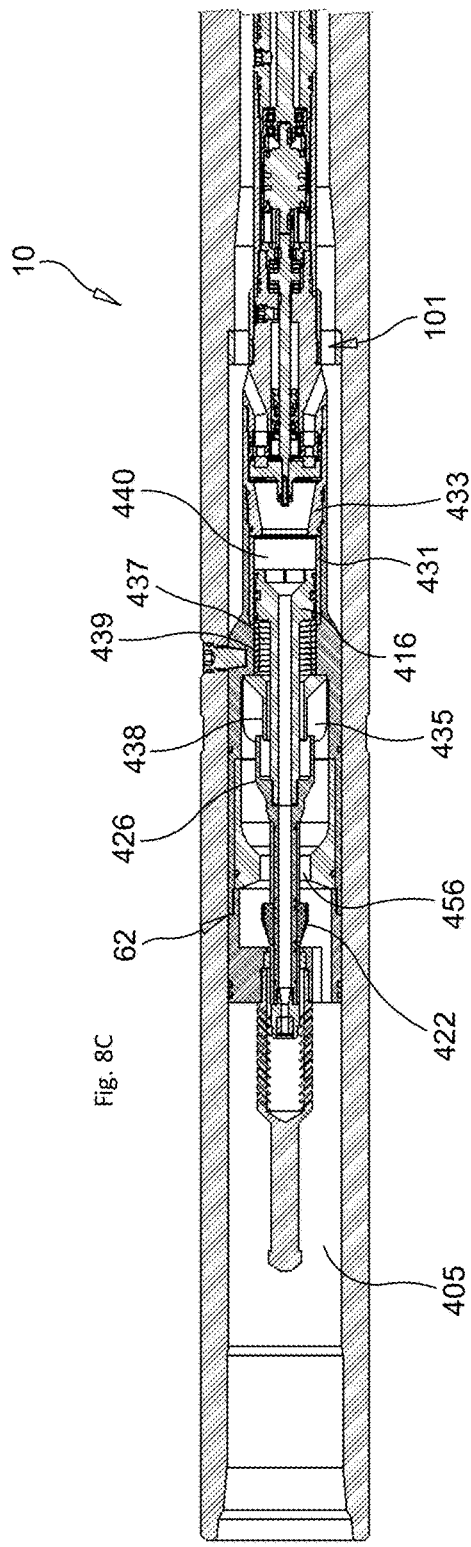

HYDRAULICALLY ASSISTED PULSER SYSTEM AND RELATED METHODS

BACKGROUND OF THE INVENTION

In general, the present invention relates to a device, system or method including a hydraulically assisted top-mounted pulser system, including a main pulser and a rotary servo valve for actuating the pulser, for generating pressure pulses in a fluid column during the process of drilling a subterranean borehole with the intent of using said pressure pulses to encode information and telemeter such information to the surface in real time.

In the drilling of deep bore holes, the rotary drilling technique has become a commonly accepted practice. This technique involves using a drill string which consists of numerous sections of hollow pipe connected together and to the bottom end of which a drill bit is attached. By imparting axial forces onto the drilling bit and by rotating the drill string either from the surface or using a hydraulic motor attached to the drill string, a reasonably smooth and circular bore hole is created. The rotation and compression of the drilling bit causes the formation being drilled to be crushed and pulverized. Drilling fluid is pumped down the hollow center of the drill string through nozzles on the drilling bit and then back to the surface around the annulus of the drill string. This fluid circulation is used to transport the cuttings from the bottom of the bore hole to the surface where they are filtered out and the drilling fluid is recirculated as desired. The flow of the drilling fluid also provides other secondary functions such as cooling and lubricating the drilling bit cutting surfaces and exerts a hydrostatic pressure against the borehole walls to help contain any entrapped gases or fluids that are encountered during the drilling process. To enable the drilling fluid to travel through the hollow center of the drill string, the restrictive nozzles in the drilling bit and to have sufficient momentum to carry cutting and debris back to the surface, the fluid circulation system at the surface includes a pump or multiple pumps capable of sustaining sufficiently high pressures and flow rates, piping, valves and swivel joints to connect the piping to the rotating drill string.

The need to measure certain parameters at the bottom of a bore hole and provide this information to the driller has long been recognized. These parameters include, but are not limited to the temperature, pressure, inclination and direction of the bore hole, vibration levels, inclination, azimuth, toolface (rotational orientation of the drill string), but also include various geophysical and lithological measurements and formation geophysical properties such as resistivity, porosity, permeability, and density as well as in situ formation analysis for hydrocarbon content. The challenge of measuring these parameters in the hostile environment at the bottom of a borehole during the drilling process and conveying this information to the surface in a timely fashion has led to the development of many devices and practices.

It is an advantage to be able send data from the bottom of a bore well to the surface, while drilling, and without the use of wires or cables, and without the continuous and/or frequent interruption of drilling activity. Thus, tools commonly referred to as "measurement while drilling" or "MWD" tools have been developed. Several types of MWD tools have been contemplated in the prior art and are discussed in brief below.

MWD tools may transmit data in several ways, including: creating EM (low frequency radio waves or signals, currents in the earth or magnetic fields) waves to propagate signals through the earth; imparting high frequency vibrations to the drill string which can be used to encode and transmit data to the surface; and creating pressure pulses to encode and transmit data to the surface of the earth from the bottom of a borehole.

MWD tools using pressure pulses can operate in a number of ways, such as: closing or opening a valve in the drill string so as to create a substantial pressure pulse that is detectable at the surface when a particular parameter reaches a preselected or particular value or threshold, or creating a series or group of pulses depending upon the parameter's value, or by using the time between the pressure pulse signals in addition to the total number of pressure pulse signals to encode information. Opening and closing and sensing may be accomplished mechanically or electronically or electro-mechanically, or by a combination thereof.

An MWD drilling tool may include a pulsing mechanism (pulser) coupled to a power source (e.g, a turbine generator capable of extracting energy from the fluid flow), a sensor package capable of measuring information at the bottom of a well bore, and a control mechanism that encodes the data and activates the pulser to transmit this data to the surface as pressure pulses in the drilling fluid. The pressure pulses may be recorded at the surface by means of a pressure sensitive transducer and the data decoded for display and use to the driller.

A pulser may create pressure pulses in a number of fashions. In one embodiment, a servo mechanism opens and closes the main pulsing mechanism indirectly. U.S. Pat. No. 9,133,950 B2 discloses servo pulser mechanisms, and is incorporated by reference in its entirety. Here, the difference in pressure caused by changes in the fluid flow do most of the work of opening and closing the main valve to generate pulses to transmit data. Such a servo mechanism assisted pulser may also be called a hydraulically assisted pulser.

A hydraulically assisted pulser of a lifting knob type typically has an obstruction, or poppet, used to create a controllable obstruction in an orifice (and a resultant pressure drop thereacross), such hydraulically assisted pulsers are driven by a servo or pilot valve.

In many cases, operators may also desire to use logging-while-drilling (LWD) sensors, which entails including one or more well logging tools downhole into the well borehole as part of the downhole tool. LWD can permit the properties of a formation to be measured during the drilling process. However, LWD sensors traditionally reside below (downhole or downstream of) the MWD platform to be as close as possible to the bit. Therefore, having a top-mounted pulser simplifies wiring and flow path integration, in-part by not requiring electrical or signal wiring to pass upstream or downstream of the main pulsing mechanism, which typically fully occupies the piece of drill pipe in which it resides. As a result, some pulser systems are designed to be top-mounted, and intended to be mounted above or upstream of the rest of the MWD and LWD system(s).

Bottom-mount pulsers, that is pulsers that are mounted towards the lower extremity of the MWD tool, are typically retrievable, i.e. they can be removed upward through the hollow center of the drill pipe, without withdrawing the drill pipe itself, usually in situations where the drill pipe is stuck in the borehole and the removal of the MWD tool from the borehole and drill pipe is desired. This ability can offer an advantage in time and costs should servicing or other access be needed. Retrievability also typically involves the servo valve being unfixed to portions of the main valve, and instead being mounted using a helix-end system, fitted into a muleshoe receiver on the main valve, and the helix end portion of the servo valve and the remainder of the MWD tool must also be sufficiently small enough in diameter to be retrieved through the inner diameter of all the drill pipe above the MWD tool. In such a system, the helix end of the servo valve must have a sufficiently small diameter to fit well within the I.D. of that muleshoe in the main valve. Thus, retrievability may come at the cost of requiring such retrievable components to have a small diameter, which in turn may have detrimental effects in the MWD system's ability to generate mud pulses of sufficient amplitude, or in the MWD system's ability to resist abrasive wear caused by the flow of drilling mud.

A top-mount pulser is usually non-retrievable and as such need not fit within the smaller I.D. that would be required if it were to be retrievable. Thus, it can have a greater cross-sectional area. This additional cross-sectional area allows for a greater power density in the driving mechanisms (motors or solenoids) and allows for greater forces to be generated relative to smaller diameter bottom-mount retrievable designs. Having a larger cross-sectional area also means that fluid flow paths can be made bigger and the mud pulse valve itself can be larger. This reduces flow velocities during the non-pulsing time and allows for better wear life, and increased resistance to blockages caused by high fluid densities which necessarily require the addition of weighting components (solids) to the drilling fluid or the addition of granular or otherwise obstructive materials (Lost Circulation Material, LCM) used to condition the borehole against fluid losses into or fluid gains from the borehole.

A top-mount design is also typically rigidly mounted to the other mechanical components of the downhole drill pipe. The ability to restrict the movement of the MWD tool and avoid impact damage caused in high vibration environments is a potential advantage.

SUMMARY OF THE INVENTION

A new and improved apparatus, system, and method of use are presented that allow an asynchronous top-mounted pulser system using hydraulic flow, an obstruction, and an orifice, to assist in the creation of pressure pulses and using hydraulic pressure on an obstruction to assist in the creation of pressure pulses. In an embodiment the obstruction is set above (upstream of) the main orifice in its open position, and the obstruction is directly pushed by fluid flow towards a closing position. In an embodiment, the pulser is controlled by a servo valve to open and close a servo valve-controlled flow path. In an embodiment, the pulser system is asynchronous, in that a servo pulser is closed and maintained closed to maintain an open position of the pulser, and temporarily opened, opening a servo valve-controlled flow path, to cause the pulser to close and create a pulse and the servo pulser is then subsequently closed to cause the pulser to open. Maintaining the servo valve-controlled flow path closed, except when creating a pulse, reduces the flow of LCM and other debris through that servo valve-controlled flow path, and reduces wear and risk of blockage. In an embodiment, no pressure relief valve is required on the bypass flow path whose opening and closing controls the state of the pulser, and only a single valve, a servo valve, controls the flow in that bypass flow path. In an embodiment, only a single bypass flow path is provided, having only a single control valve, with that control valve located downstream of the main pulser.

An embodiment of the invention is a method and apparatus including a main pulser valve that is used to transmit information to the surface from a subsurface location during the process of drilling a borehole. A rotary servo pulser is coupled to a pressure pulse generator or "pulser", a controller and a power source all of which reside inside a short section of drill pipe close to the bit at the bottom of the borehole being drilled. The assembled apparatus or "MWD tool" can be commanded from the surface to make a measurement of desired parameters and transmit this information to the surface. Upon receiving the command to transmit information, the downhole controller gathers pertinent data from a sensor package and transmits this information to the surface by encoding data in pressure pulses. These pressure pulses travel up the fluid column inside the drill pipe and are detected at the surface by a pressure sensitive transducer coupled to a computer which decodes and displays the transmitted data.

An embodiment of the invention comprises a system for actuating a pulser and telemetering information to the surface from a subsurface location, and may more specifically comprise a main pulser valve, a rotary servo pulser, a controller assembly and a power source assembly. The method may comprise operating an electric motor to operate the rotary servo pulser to actuate the pulser to transmit the information via the pressure pulses. These operate in an environment in which mud (drilling fluid) is commonly pumped downhole through the pulser system toward the bit and rockface.

An embodiment of the invention comprises a top-mounted main valve assembly or pulser which creates mud pressure pulses that are used to encode and transmit data to the surface. One embodiment of such a pulser includes an orifice creating a pressure drop in the mud (fluid) flow, and a longitudinally movable piston and shaft assembly responsive to pressures on opposing sides of said piston, that is, to the differential pressure applied across those sides, and thus to the net pressure applied across the piston. The pulser also allows fluid downstream of the orifice to communicate with the downstream side of the piston. The pulser also includes a fluid channel communicating between the upstream side of the pulser assembly and the downstream side of said piston, to provide a pressure differential thereto, in a chamber closed at one end by the downstream face of that piston. In one embodiment, such a fluid channel is provided within the inside of the shaft, exiting from the downstream face of that piston. The entrance of that fluid channel may be an inlet hole on the upstream end of the shaft.

A biasing mechanism urges the piston downstream, toward the servo valve. In an embodiment, a coil spring is located upstream of the two-faced piston, is compressed between the upstream face of the piston and a shoulder located upstream of the piston, and urges the piston downstream. In an embodiment, a piston cylinder houses the piston, and the spring shoulder at its upstream end. That upstream end may also be open to provide fluid communication with the fluid downstream of the orifice and to allow the shaft to pass downstream to the piston. In an embodiment, that upstream end inlet and shoulder may be formed by narrowing the diameter of the piston cylinder to a small amount larger than that of the O.D. of the shaft, and extending it upstream along the shaft. In an embodiment, the shaft also includes an inlet shield or filter, to prevent LCM blockage of the upstream inlet end. It may be attached or formed onto the shaft, extending outwardly from the O.D. thereof to a diameter slightly larger than the O.D. of the upstream extension of the upstream end inlet and extending downstream. The inlet shield is formed to the shaft upstream of the end of the upstream extension of the upstream end inlet when the shaft is in its full downstream stroke position, and to extend downstream sufficiently to still cover that upstream extension of the upstream end inlet when the shaft is in its full upstream stroke position.

The piston and shaft assembly also includes an obstruction mounted on the shaft to selectively be moved closer to, or within the orifice, or away from the orifice. This is also referred to as opening or closing the valve, but does not require fully stopping the flow or providing completely unobstructed flow. The obstruction, in the open position, is upstream of the orifice and, in the closed position, partially or completely in the orifice. In an embodiment, the obstruction is a poppet formed on the outside of the shaft having a roughly conical shape so that the broad end is pointed downstream. The main orifice, in an embodiment, includes a steeply angled face upstream of a centrally-located hole, the face forcing fluid to change direction sharply and a downstream side opening more gently in a contoured shape to a wide opening.

In an embodiment, the inlet hole on the upstream end of the shaft is relatively small in diameter, and is protected from clogging by LCM by a filter. In an embodiment, the filter mechanism is fixed in the upstream end of the pulser, and includes an elongated hollow channel in which the upstream end of the movable shaft (including the inlet for the fluid channel) can freely slide, where the channel is pierced by multiple slits having their inlet sides downstream of their outlet sides on the inside of the channel. That filter mechanism may also be supplied with a lifting knob formed at the terminal upstream end thereof. The upstream end of the pulser also may contain a bearing mechanism for the upstream end of the movable shaft. In an embodiment, that bearing mechanism engages the shaft upstream of the obstruction.

In an embodiment, the downstream end of the pulser includes a connecting chamber for connecting to the upstream end of a servo valve. That chamber may be connected at its upstream to the piston cylinder, wherein the fluid in that chamber and the piston cylinder are contained at the upstream end by the downstream face of the piston, and at the downstream end by the servo valve.

An embodiment of the invention includes a servo valve including a valve seat and a rotating portion driven by a servo shaft. The rotating part includes structures to obstruct flow through the valve seat. The structures may extend off the rotating part to contact the valve seat. Those structures may be longitudinally-extending tips formed to slide rotatably over the valve seat. More than one fluid path may be provided through the servo pulser, such as by four holes in the valve seat, which may be circular, and may be symmetrical about the axis around which the rotating part rotates. The rotation of the rotating part may be limited by one or more stops. The stops may be formed on a structure supporting the valve seat or as a separate structure from the valve seat. The stops may be rotationally fixed with respect to the fluid path, or in one embodiment, the valve seat, and be indirectly in contact with that seat. The valve seat and flow obstructing structures may be hard and/or wear and abrasion resistant. The servo shaft, stops, supporting structure, and rotating part may be nonbrittle, and shock and vibration resistant.

In an embodiment, the rotating part and servo shaft are upstream of the valve seat, where the valve seat engages with the connecting chamber of the pulser. The fluid paths may be the downstream ends of the fluid in the connecting chamber and the piston cylinder, when the servo valve is open, and the closed valve may be the downstream end of the fluid in the connecting chamber and the piston cylinder, when the servo valve is closed.

Rotating the servo pulser may include transmitting torque, such as from a gearmotor, through a pressure compensated section or using a magnetic torque transmitting device to a shaft operating a servo valve.

An embodiment of the invention includes a transmitter assembly for a mud pulse telemetry MWD system in which there are upstream and downstream directions, in which the transmitter assembly includes an outer housing, an orifice that is in a fixed position in the housing, and having a movable valve poppet positioned in the housing to affect mudflow through the orifice, where the poppet is on the upstream side of the orifice. There is a piston and shaft assembly connected to the poppet for controlling its position relative to the orifice. The transmitter assembly also includes a by-pass conduit forming a mudflow path by-passing the orifice through the piston assembly, where there is also a pilot valve on the by-pass conduit downstream of the piston for enabling and disabling mud flow through the by-pass conduit. Mudflow through the by-pass conduit creates a net force on the piston urging the poppet to shut with respect to the orifice.

An embodiment of the invention includes a transmitter assembly for a mud pulse telemetry MWD system having upstream and downstream directions, in which the transmitter assembly includes an outer housing, an orifice that is in a fixed position in the housing, and having a movable valve poppet positioned in the housing to affect mudflow through the orifice, a piston and shaft assembly connected to the poppet for controlling the position of the poppet relative to the orifice, and a pilot valve for enabling and disabling mud flow through the by-pass conduit. The transmitter assembly also includes a by-pass conduit defining a mudflow path by-passing the orifice and through the piston assembly, where pressure due to mudflow in the by-pass conduit creates a net force on the piston in the upstream direction urging the poppet to open with respect to the orifice and mudflow past the poppet directly creates a net force on poppet in the downstream direction urging the poppet to shut with respect to the orifice.

An embodiment of the invention includes a transmitter assembly for a mud pulse telemetry MWD system having upstream and downstream directions, in which the transmitter assembly includes an outer housing, an orifice that is in a fixed position in the housing, and having a movable valve poppet positioned in the housing to affect mudflow through the orifice, and a piston and shaft assembly connected to the poppet for controlling the position of the poppet relative to the orifice. The assembly includes a piston having upstream and downstream sides and a biasing mechanism urging the poppet to open with respect to the orifice. The transmitter assembly also includes a by-pass conduit defining a mudflow path by-passing the orifice and through the piston assembly and a pilot valve for enabling and disabling mud flow through the by-pass conduit, where mudflow through the by-pass conduit on the upstream side of the piston urges the poppet to shut with respect to the orifice and mudflow through the orifice on the downstream side of the piston urges the poppet to open with respect to the orifice, and mudflow past the poppet directly creates a net force on poppet in the downstream direction urging the poppet to shut with respect to the orifice.

An embodiment of the invention includes a transmitter assembly for a mud pulse telemetry MWD system having upstream and downstream directions, in which the transmitter assembly includes an outer housing, an orifice that is in a fixed position in the housing, and having a movable valve poppet positioned in the housing upstream of the orifice to affect mudflow through the orifice, and a piston and shaft assembly connected to the poppet for controlling the position of the poppet relative to the orifice. The transmitter assembly also includes a by-pass conduit defining a mudflow path by-passing the orifice and through the piston assembly, a pilot valve for enabling and disabling mud flow through the by-pass conduit, where the pilot valve is the sole valve on the by-pass conduit, and mudflow through the by-pass conduit creates a net force on the piston urging the poppet to shut with respect to the orifice.

An embodiment of the invention includes a transmitter assembly for a mud pulse telemetry MWD system, in which the transmitter assembly includes a servo pulser and a pulser. The pulser includes an orifice within the pulser with upstream and downstream sides, a poppet movably positioned in the pulser on the upstream side of the orifice to affect mudflow through the orifice, and a piston assembly connected to the poppet for controlling its position relative to the orifice. The transmitter assembly also includes a first by-pass conduit defining a mudflow path by-passing the orifice and through the piston assembly, where the first by-pass conduit has no valve. The servo pulser includes a second by-pass conduit hydraulically connected to the first by-pass conduit that provides a sole mudflow outlet for the first by-pass conduit, and a pilot valve for enabling and disabling mud flow through the second by-pass conduit. In the transmitter assembly, mudflow through the by-pass conduit creates a force on the piston which is greater than the force on the poppet, causing the poppet to shut with respect to the orifice.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

FIG. 6A is a three-dimensional view of parts of the servo valve of the servo pulser as embodied in FIG. 3 shown in one orientation where the valve is closed.

FIG. 6B is a three-dimensional view of parts of the servo valve of the servo pulser as embodied in FIG. 3 shown in another orientation where the valve is open.

FIGS. 8A-8D are two-dimensional cross-sectional views of the pulser and a portion of the servo pulser in different phases of operation.

DETAILED DESCRIPTION

In one embodiment of the invention, as described in detail below, information of use to the driller is measured at the bottom of a borehole relatively close to the drilling bit and this information is transmitted to the surface using pressure pulses in the fluid circulation loop. The command to initiate the transmission of data is sent by stopping fluid circulation and allowing the drill string to remain still for a minimum period of time. Upon detection of this command, the downhole tool measures at least one downhole condition, usually an analog signal, and this signal is processed by the downhole tool and readied for transmission to the surface. When the fluid circulation is restarted, the downhole tool waits a predetermined amount of time to allow the fluid flow to stabilize and then begins transmission of the information by repeatedly closing and then opening the pulser valve to generate pressure pulses in the fluid circulation loop. The sequence of pulses sent is encoded into a format that allows the information to be decoded at the surface and the embedded information extracted and displayed.

Figure 1A:
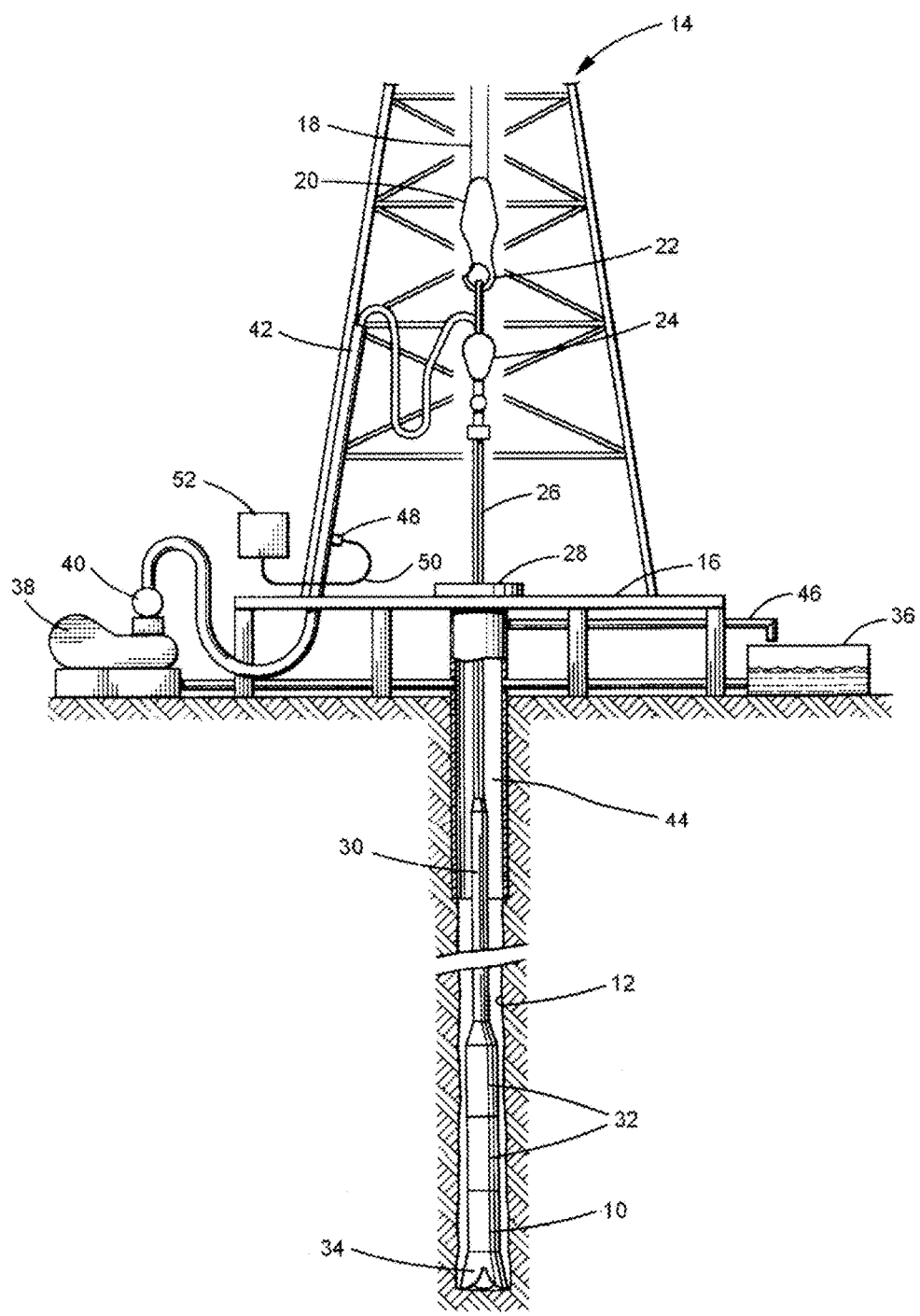
FIG. 1A is a representative view of parts of the surface and downhole portions of a drilling rig.

Referring now to the drawings and specifically to FIG. 1A, there is generally shown therein a simplified sketch of the apparatus used in the rotary drilling of boreholes 12. A borehole 12 is drilled into the earth using a rotary drilling rig which consists of a derrick 14, drill floor 16, draw works 18, traveling block 20, hook 22, swivel joint 24, kelly joint 26 and rotary table 28. A drill string 30 used to drill the bore well is made up of multiple sections of drill pipe that are secured to the bottom of the kelly joint 26 at the surface and the rotary table 28 is used to rotate the entire drill string 30 while the draw works 18 is used to lower the drill string 30 into the borehole and apply controlled axial compressive loads. The bottom of the drill string 30 is attached to multiple drilling collars 32, which are used to stiffen the bottom of the drill string 30 and add localized weight to aid in the drilling process. A measurement while drilling (MWD) tool 10 is generally depicted attached to the bottom of the drill collars 32 and a drilling bit 34 is attached to the bottom of the MWD tool 10.

The drilling fluid or "mud" is usually stored in mud pits or mud tanks 36, and is sucked up by a mud pump 38, which then forces the drilling fluid to flow through a surge suppressor 40, then through a kelly hose 42, and through the swivel joint 24 and into the top of the drill string 30. The fluid flows through the drill string 30, through the drill collars 32, through the MWD tool 10, through the drilling bit 34 and its drilling nozzles (not shown). The drilling fluid then returns to the surface by traveling through the annular space 44 between the outer diameter of the drill string 30 and the well bore 12. When the drilling fluid reaches the surface, it is diverted through a mud return line 46 back to the mud tanks 36.

The pressure required to keep the drilling fluid in circulation is measured by a pressure sensitive transducer 48 on the kelly hose 42. The measured pressure is transmitted as electrical signals through transducer cable 50 to a surface computer 52 which decodes and displays the transmitted information to the driller.

Figure 1B:
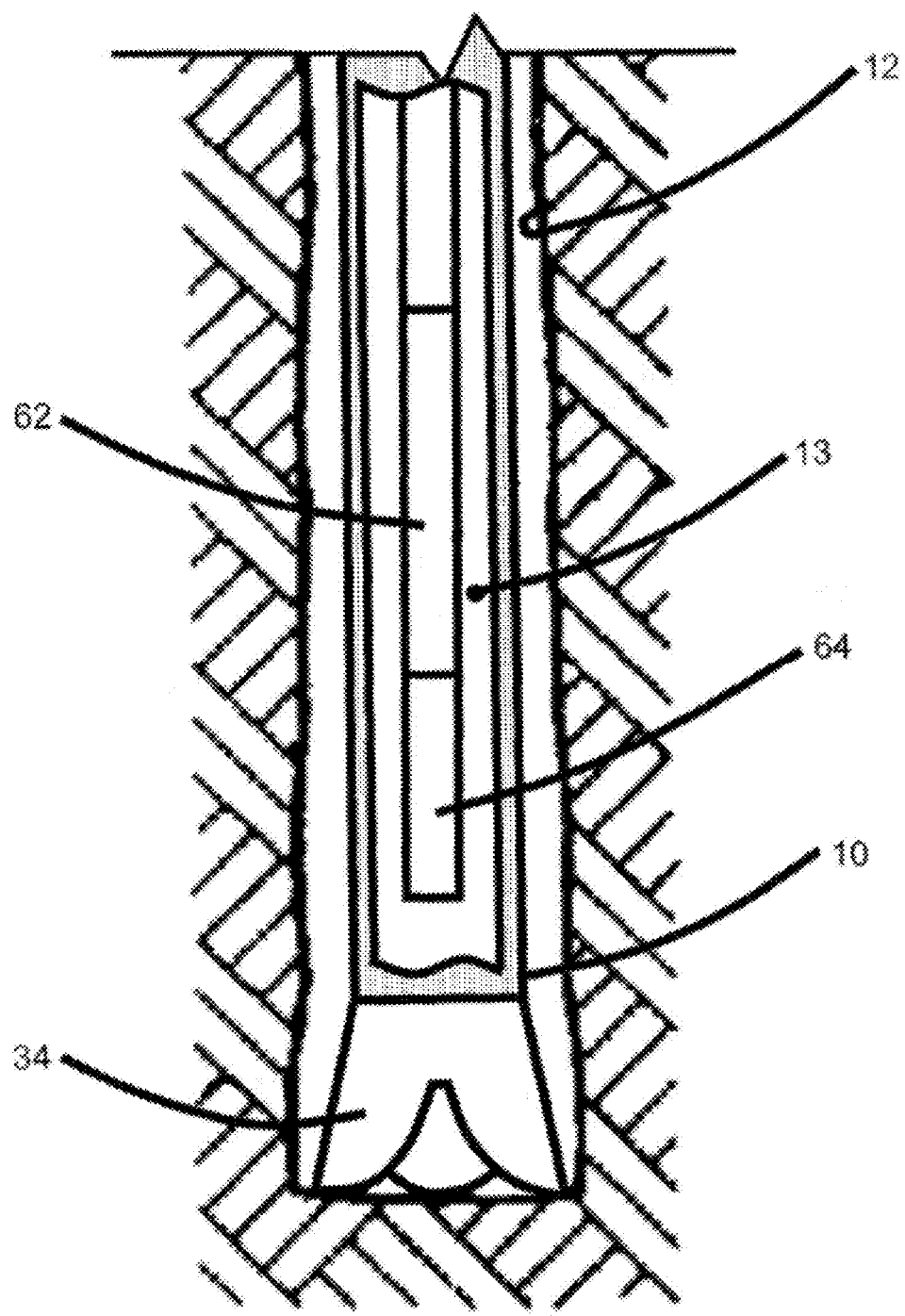
FIG. 1B is a partial cutaway of the upper portion of the MWD tool shown as shown in FIG. 1A.

FIG. 1B shows a partial cutaway of the upper portion of the MWD tool 10 to reveal pulser 62 connected to servo pulser 64. Both are located within the inner diameter of MWD tool 10. The one end of pulser 62 is connected to servo pulser 64 to create a path for drilling fluid between those components. The other end of pulser 62 is in contact with the internal drilling fluid column 13 within the inner diameter of MWD tool 10.

Figure 1C:
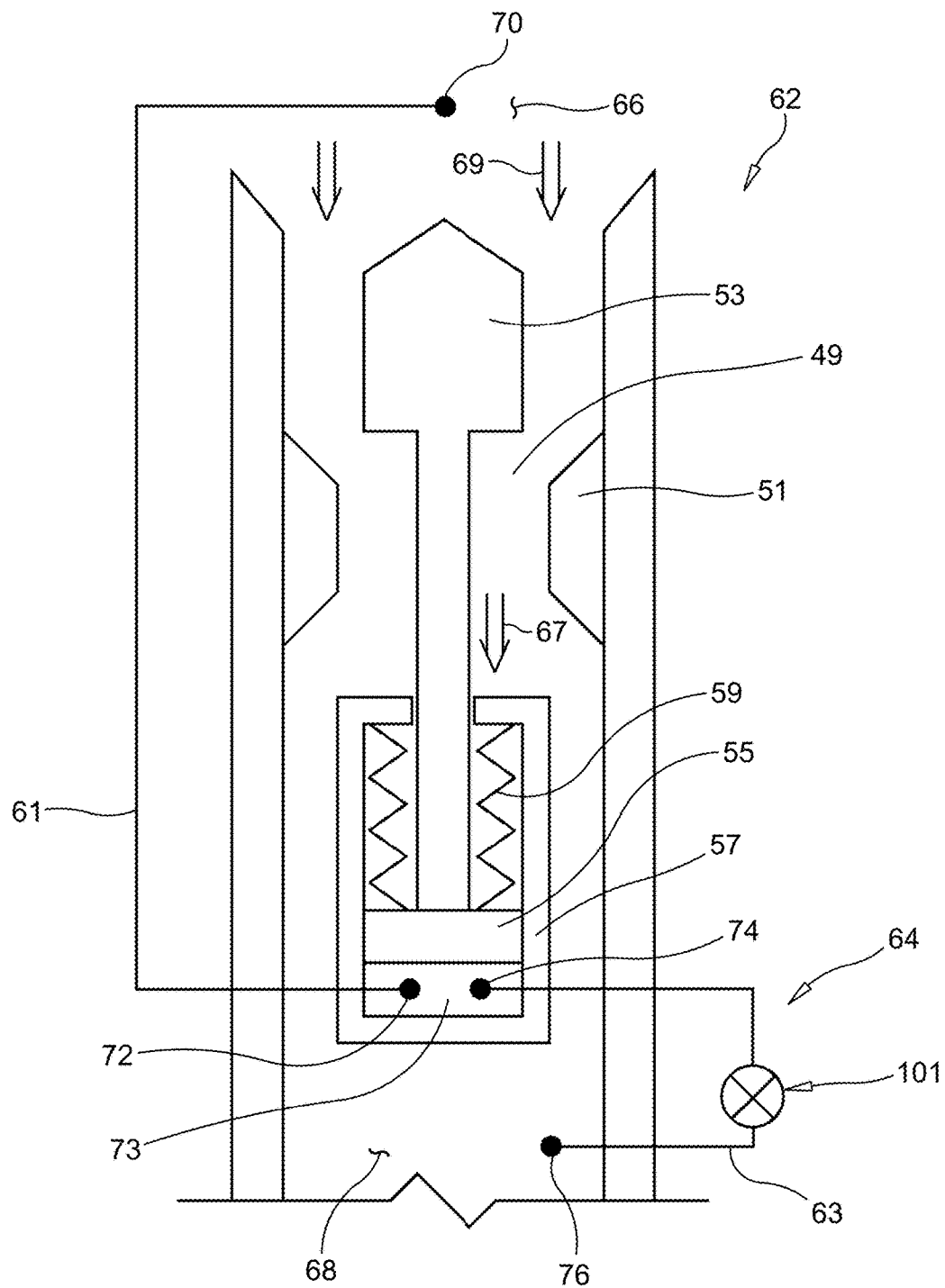
FIG. 1C is a schematic functional drawing of main pulser and a portion of the servo pulser within the MWD tool shown as shown in FIG. 1A.

FIG. 1C shows a schematic functional representation of pulser 62 and servo pulser 64 illustrating fluid flow paths within those components of MWD tool 10. Servo pulser 64 includes servo valve 101. The upstream end of pulser 62 is exposed to fluid flow 69, which flows from inlet side 66 to outlet side 68, undergoing a pressure drop across orifice 49 and resulting in the pressure of inlet side 66 being higher than outlet side 68. Orifice 49 is variable in size, and is formed by fixed constriction 51 and variable constriction 53. Variable constriction 53 is located upstream of fixed constriction 51, and is attached to piston 55, which is downstream of fixed constriction 51. Piston 55 is enclosed within cylinder 57, which is open at its upstream end to admit piston 55, but closed at its downstream end to contain pressure in chamber 73, which imposes an upstream force on the downstream face of piston 55. Spring 59 imposes a downstream bias upon the upstream face of piston 55 and thus on variable constriction 53. Finally, an open upstream end of cylinder 57 allows low pressure fluid flow 67 downstream of orifice 49 to flow past spring 59 and exposes the upstream side of piston 55 to that pressure, thus imposing a downstream force on the upstream face of piston 55.

In addition to fluid flow 69, two independent flow paths are provided. Pulser bypass path 61 allows fluid to enter at inlet 70, flow from inlet side 66 to outlet 72 in chamber 73. That flow thus bypasses orifice 49, exposing chamber 73 to high pressure fluid from inlet side 66. In an embodiment, bypass path 61 is uncontrolled, that is, it lacks valves controlling flow thereon, and flow is driven merely by pressure differentials between inlet side 66 and chamber 73. Outlet path 63 allows fluid to enter at inlet 74, flow from chamber 73 to outlet 76 in outlet side 68. Outlet path 63 is controlled by servo valve 101, to control flow escaping from chamber 73 to low pressure outlet side 68, and thus reducing the pressure therein. In an embodiment, outlet path 63 controlled by servo valve 101 offers the only escape for fluid in chamber 73.

In operation, at substantially steady state fluid flow, servo valve 101 is closed, while the pulser 62 is open, resulting in an asynchronous pulsing system. Holding servo valve 101 closed permits bypass path 61 to maintain a high pressure in chamber 73 via hydraulic pressure transmission from inlet side 66, and thus creating a large opening force on piston 55. Variable constriction 53 is maintained in an open position because that opening force is balanced by three closing forces. The first is that caused by lower-pressure fluid (from downstream of the orifice and lower because of pressure drop across the orifice) reaching piston 55 via low pressure fluid flow 67. The second is that caused by spring 59, which is in a compressed, or loaded, state. The third is that caused by downstream fluid flow 69 on variable constriction 53.

Operating the asynchronous pulsing system to create a pulse is initiated by servo pulser 64 commanding servo valve 101 to open, causing outlet path 63 to permit flow from chamber 73 to outlet side 68. As chamber 73 is a high pressure area and outlet side 68 is a low pressure area this means fluid will escape chamber 73, reducing the chamber pressure and creating a pressure differential causing flow from inlet side 70 through bypass path 61. As a result, the opening force on variable constriction 53 drops, unbalancing the steady state forces holding variable constriction 53 in an open position and causing variable constriction 53 to begin to close. Together, outlet path 63 and bypass path 61 between inlet side 66 and outlet side 68 are in hydraulically in parallel with the main flow path (e.g. downstream fluid flow 69 leading to low pressure fluid flow 67). Thus, opening outlet path 63 and bypass path 61 results in the pressure drop across them to be, temporarily at least, the same as across the main flow path between inlet side 66 and outlet side 68. As variable constriction 53 moves downstream in a closing direction, orifice 49 becomes more constricted, increasing the pressure drop thereacross. The reduction of pressure of low pressure fluid flow 67 reduces the low pressure fluid flow closing force, and translation of piston 55 in the closing direction reduces the spring force closing force therefrom. But the forces remain unbalanced in the closing direction because the fluid flow forces remain roughly constant and then increase as orifice 49 continues to constrict and variable constriction 53 approaches a closed state. This continued force imbalance creates a positive feedback loop, and causes pulser 62 to close rapidly, creating a pressure pulse in fluid flow 69.

Resetting the pulsing system is initiated by servo pulser 64 commanding servo valve 101 to close, cutting off fluid flow through outlet path 63. Continuing to expose chamber 73 to high pressure fluid from inlet side 66 through bypass path 61 area causes the pressure in chamber 73 to rise to approximately that of inlet side 66, which is higher than outlet side 68 and that in low pressure fluid flow 67 downstream of orifice 49. Thus, the opening force on the downstream side of piston 55 rises substantially. As reset is initiated, the low pressure fluid flow closing force on the upstream side of piston 55 is low because the outlet side pressure is low due to the high pressure drop across orifice 49 (or due to flow being completely cut off thereby). Spring closing force is lower because spring 59 is in a more relaxed state. Thus, the forces are now unbalanced in the opening direction, despite the fluid flow closing forces remaining high. As variable constriction 53 translates in the upstream opening direction, orifice 49 opens, causing a reduction in the pressure drop thereacross, and increasing the outlet side pressure and low pressure fluid flow closing force. Likewise, translation in the opening direction forces compression of spring 59. Eventually, the forces balance out (or a positive stop is reached) and variable constriction 53 reaches a steady state open position.

Figure 2:
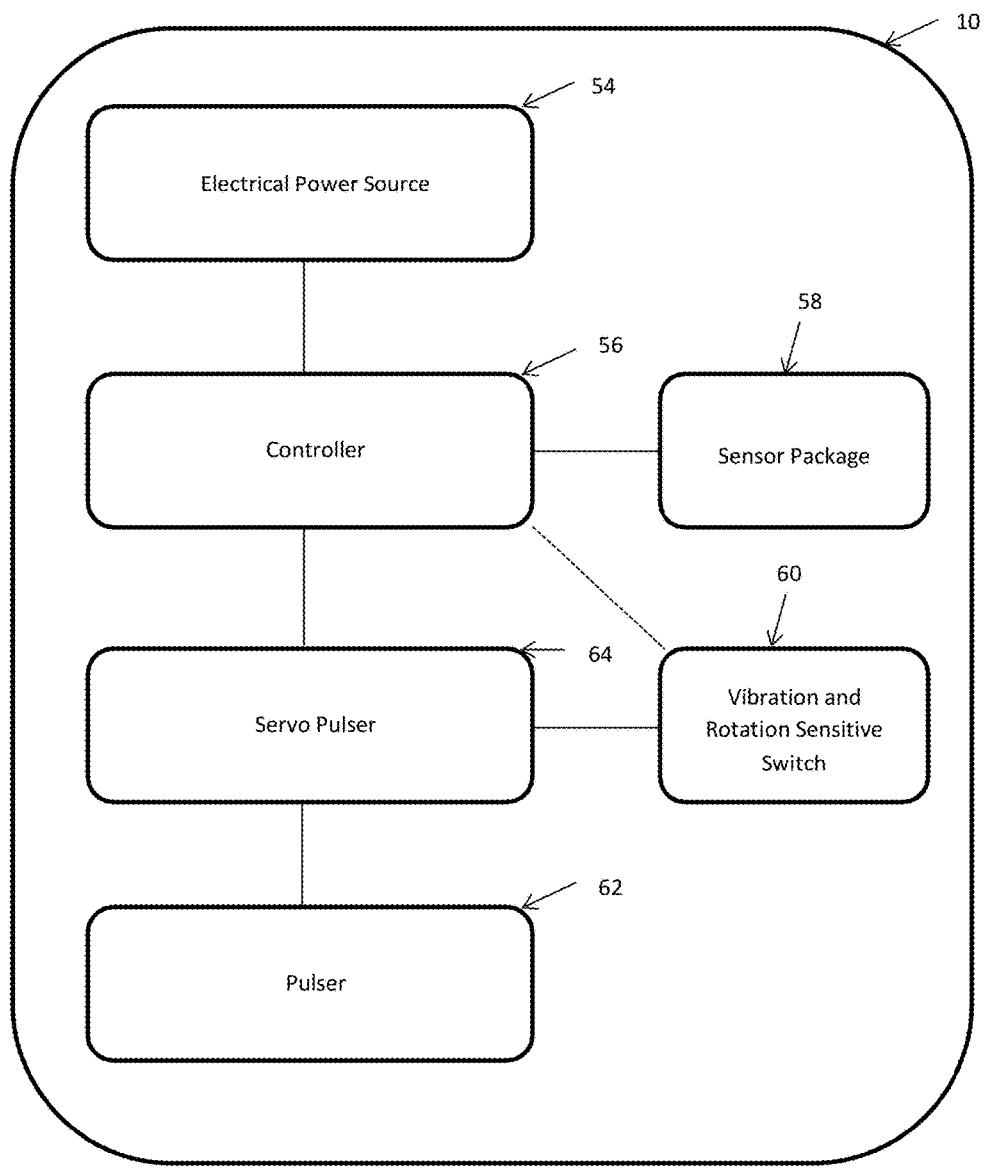
FIG. 2 is a representative view of the various components that together may comprise the downhole portion of an MWD tool.

FIG. 2 generally shows a schematic representation of the various components that together make up the downhole portion of an MWD tool. The downhole MWD tool 10 consists of an electrical power source 54 coupled to controller 56. Controller 56 is coupled to sensor package 58 and servo pulser 64. The servo pulser 64 is coupled to a vibration and rotation sensitive switch 60 and a pulser 62.

FIG. 2 shows one embodiment of the method of the MWD tool. Another embodiment (not depicted) is one in which the vibration and rotation sensitive switch 60 is integrated into the servo pulser 64. Another embodiment (not depicted) is one in which controller 56 is integrated into the servo pulser 64 which is directly connected to sensor package 58.

Controller 56 in FIG. 2 has the ability to be alerted or informed of the status of the vibration and rotation present in the drill string either by directly communicating to the vibration and rotation sensitive switch 60 or by having this information transmitted through the servo pulser 64. The vibration and rotation sensitive switch 60 can be integrated into the controller 56 and can thereby acquire this information directly.

Figure 3:
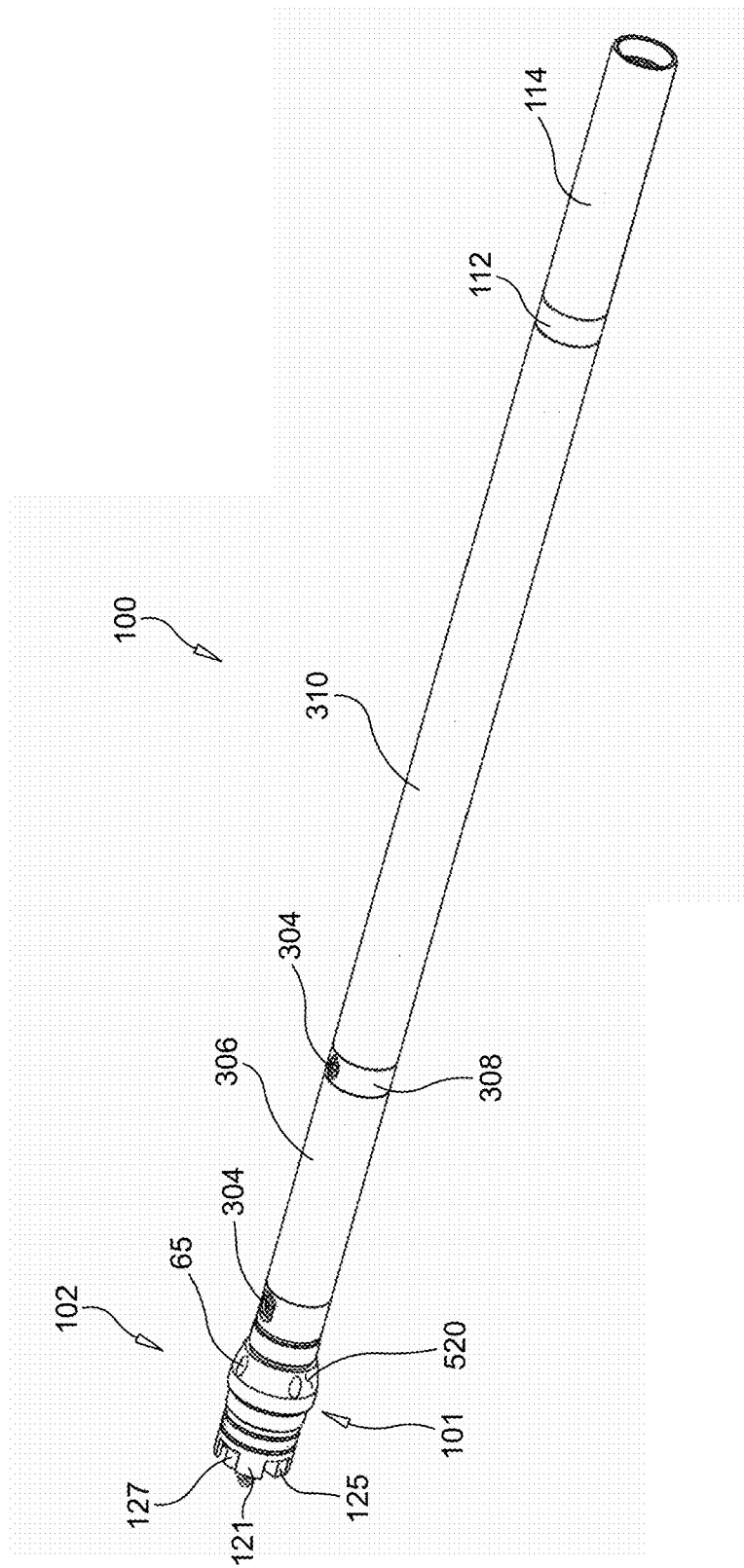
FIG. 3 is a three-dimensional view of one embodiment of the servo pulser.

FIG. 3 generally shows a three-dimensional view of a servo pulser 100 in an embodiment. The outer sections of the servo pulser 100 comprise servo valve housing 102 into which are formed servo fluid ports 65, in this embodiment, four thereof, spaced radially about angled face 520 and connecting to servo holes 124. The purpose of servo fluid ports 65 is to allow drilling fluid to exit servo valve 101 portion of servo pulser 100 located substantially inside servo valve housing 102 and connect the fluid at servo holes 124 (see FIG. 5) to the fluid outside servo valve housing 102. Filtering/screen mechanisms are often used to restrict the ingress of large particulate matter as are sometimes present in the drilling fluid, but as angled face 520 is against the flow, a filter/screen is unnecessary. Upstream of angled face 520 are rotor 125 and its lateral extensions 127, and stops 121.

FIGS. 4A, 4B, 4C and 4D generally show a cross section view of servo pulser 100 as depicted in one of its compensated embodiments as shown in FIG. 3.

FIG. 3, and with reference to FIGS. 4A-4D, also shows servo valve housing 102 which houses piston compensator 522 and axial bearing set 524 and servo shaft 126. Piston compensator 522 can slide longitudinally on servo shaft 126 within shaft chamber 518. Servo valve housing 102 is attached at valve body 516 to compensator housing 306. Compensator housing 306 encloses dual shaft gearbox 322 for coupling to and driving servo shaft 126 and is attached at its far end to magnetic bulkhead 308, and encloses a connection between the output end of drive shaft 334 extending through magnetic bulkhead 308 and the input shaft into dual shaft gearbox 322. Oil fill plug 304 is provided in valve body 516 to permit filling the interior of compensator housing 306 and magnetic bulkhead 308 with hydraulic oil for lubrication and pressure compensation, that is, to balance internal oil pressure on gaskets and seals with the exterior fluid pressure.

At its far end, magnetic bulkhead 308 is attached to electronics housing 310. At that end, and enclosed by electronics housing 310, magnetic bulkhead 308 also includes magnetic coupling inner 338, part of a coupling device to transmit torque between two drive shafts through the use of a plurality of matched magnets. Piston compensator 522 in servo valve housing 102 is exposed to the pressure of the drilling fluid on its upstream side, transmitting that pressure to its downstream side (in shaft chamber 518) to compress the oil-filled interior of compensator housing 306 and magnetic bulkhead 308.

Electronics housing 310 includes magnetic coupling outer 350, which is physically aligned and magnetically coupled with magnetic coupling inner 338. This permits rotation of magnetic coupling outer 350 to be transferred to magnetic coupling inner 338 thereby transmitting rotation of electric motor 360 through the magnetic coupling outer 350, through magnetic coupling inner 338, and further through drive shaft 334 and then to the input shaft of dual shaft gearbox 322. Electronics housing 310 includes motor driver 166, and at its far end is attached to interconnect bulkhead 112, which in turn is attached to interconnect housing 114.

Interconnect bulkhead 112 and interconnect housing 114 include components that allow servo pulser 100 to be mechanically and electrically connected to controller 56 or electrical power source 54 or in general, to other components that may make up part of MWD tool 10, such as connector 174.

In addition, paying attention to FIG. 3 as a whole, it is intended in this particular embodiment of the invention that interconnect housing 114 be used to attach servo pulser 100 to controller 56 or electrical power source 54 and servo valve housing 102 be used to connect servo pulser 100 to pulser 62 of MWD tool 10.

Figure 5:
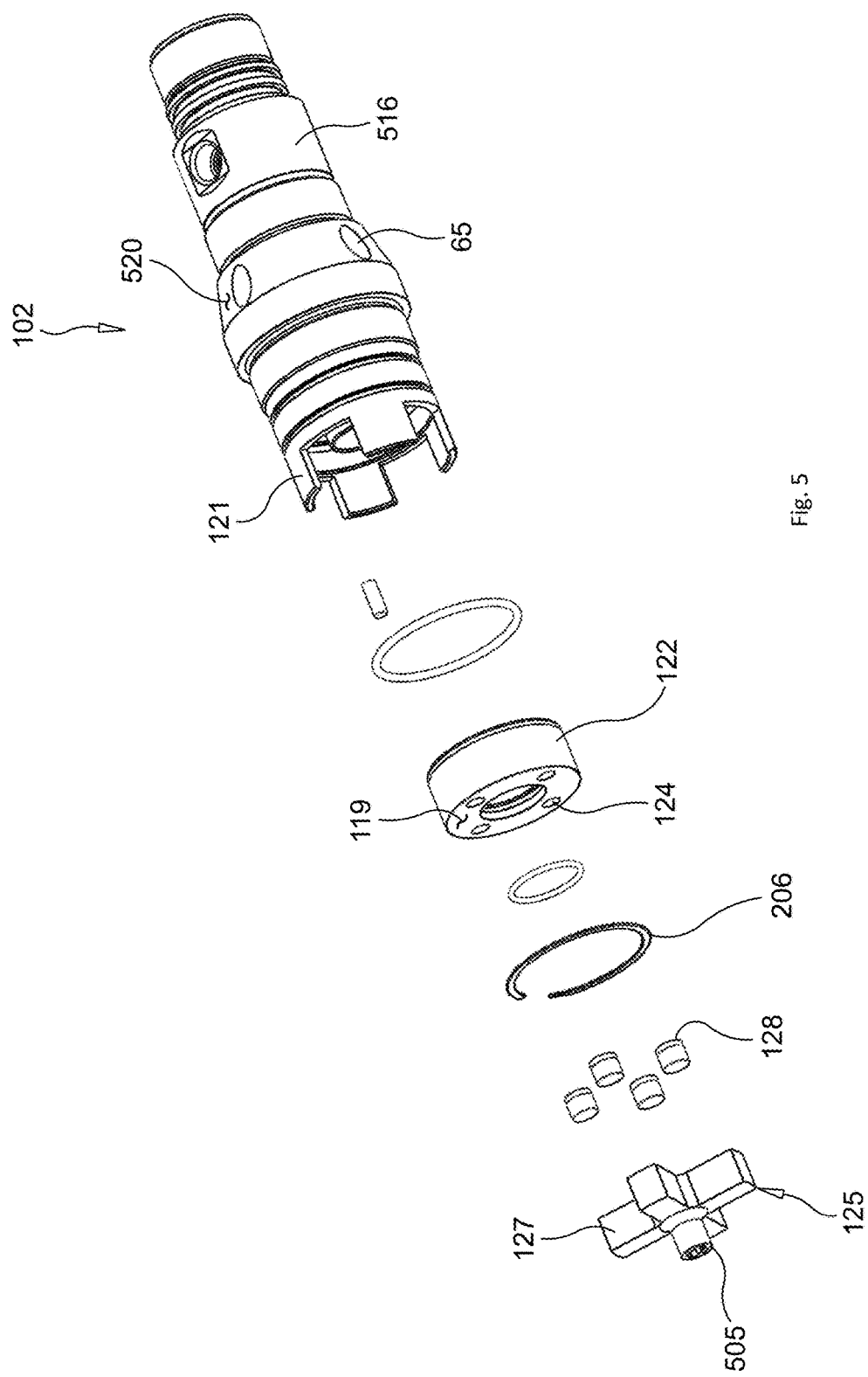
FIG. 5 is an exploded three-dimensional view of the servo valve section of the servo pulser as embodied in FIG. 3.
Figure 7:
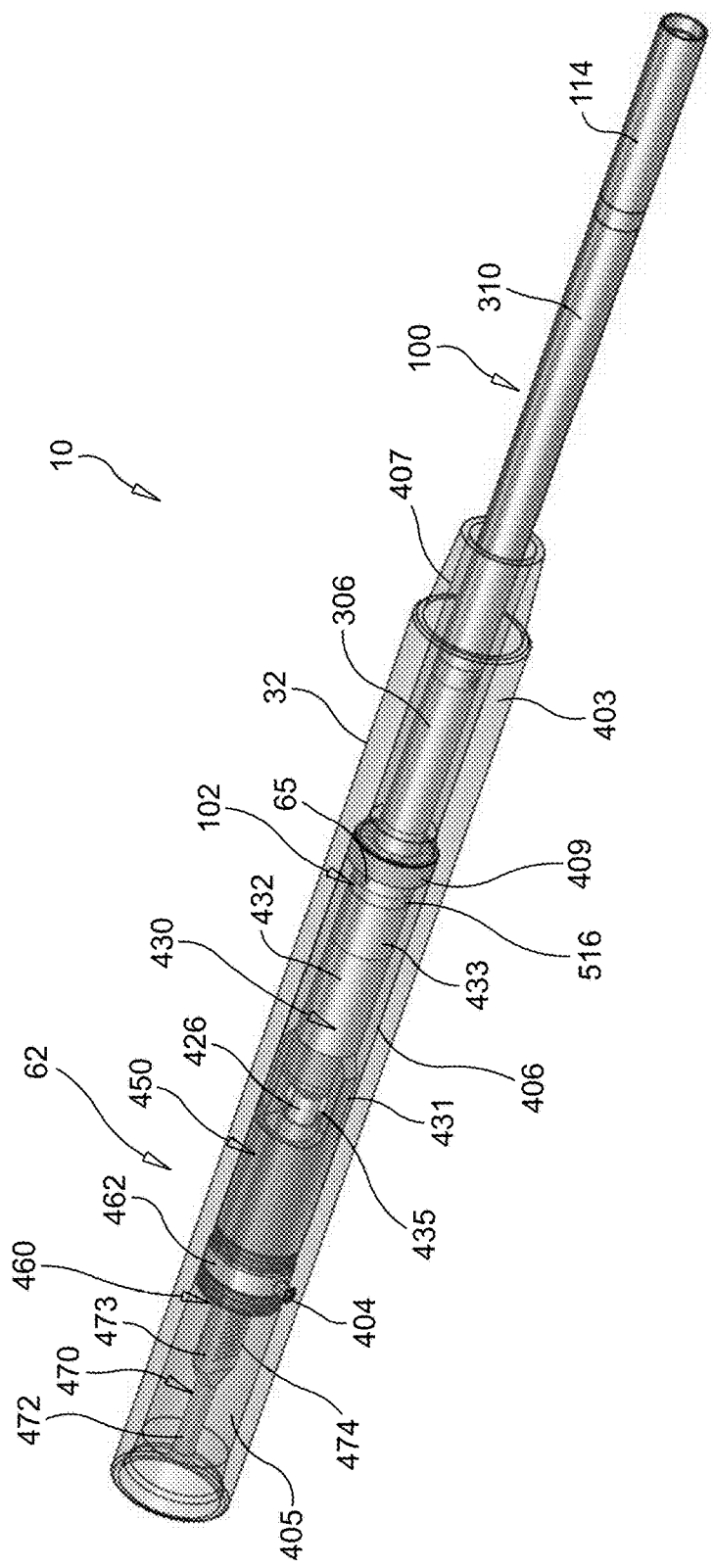
FIG. 7 is a three-dimensional view of the servo valve and servo pulser inside a part of the MWD tool casing rendered transparent.

FIG. 5 generally shows an exploded three-dimensional view of the rotary servo valve which is substantially located inside servo valve housing 102.

FIGS. 6A and 6B generally show three-dimensional views of the servo valve which is substantially located inside servo valve housing 102 in both their open and closed orientations.

To further explain the components and for purposes of convenience and clarity, the following will describe individual sections of servo pulser 100 shown in FIGS. 4A, 4B, 4C, and 4D while referring to FIGS. 5, 6A, 6B which show substantially these same components in a three-dimensional view. In addition, FIG. 8A shows servo valve 101 and servo valve housing 102, and servo valve housing 102 as connected to compensator housing 306, in cross section.

Servo valve 101 is the upstream end of servo pulser 100, and closest to pulser 62. Servo valve 101 comprises servo valve housing 102, which includes valve body 516, servo seat 122, and servo holes 124 and servo fluid ports 65. Servo valve housing 102 connects servo pulser 100 to pulser 62 by a threaded connection between valve body 516 and servo chamber body 433. Centralizers 409 support valve body 516 within casing 403. Servo seat 122 is installed in valve body 516 of servo valve housing 102, on the upstream end thereof closest to pulser 62, and does not rotate relative to servo valve housing 102. A retainer 206 is installed in servo seat 122 to restrict the ability of servo seat 122 to move axially along the length of valve body 516 or servo pulser 100. Servo seat face 119 is formed on servo seat 122, and faces upstream, into the flow. Four servo holes 124 are formed through servo seat face 119 and servo seat 122 to create a fluid pathway through valve body 516 and out of servo valve 101. Servo holes 124 connect in the downstream direction to servo fluid ports 65.

Servo valve 101 also comprises rotor 125 and servo shaft 126. Servo shaft 126 extends in the flow direction (away from pulser 62) from rotor end 504 on the upstream side of servo seat 122 therethrough, and passes through the shaft chamber 518 formed centrally in servo valve housing 102, and then through piston compensator 522. Downstream thereof, servo shaft 126 is retained axially by axial bearing set 524, which is retained by a shoulder formed in servo valve housing 102. Axial bearing set 524 provides axial positioning and permits rotation of servo shaft 126.

Rotor end 504 of servo shaft 126 is joined by spline 505 to rotor 125 so that servo shaft 126 can transmit the downstream axial force provided by axial bearing set 524. Spring 506 is provided between spline 505 and rotor 125, causing an axial force in the downstream direction on rotor 125. This force keeps servo tips 128 in constant contact with servo seat 122 even when servo pulser 100 is subject to high vibrations and shock that are present in the drilling environment. Thus, servo tips 128 are be pressed against servo face 119 of servo seat 122 to provide adequate sealing. Rotor 125 includes four lateral extensions 127. Lateral extensions 127 extend radially from the center of rotor 125.

Four servo tips 128 are attached to lateral extensions 127, and indirectly to servo shaft 126. This may be by means of an interference press fit. In an embodiment, four servo tips 128 are located in a circular rotor, having axial holes therein for fluid flow. The number of servo tips, servo holes and servo fluid ports here is four, though the number could vary depending upon needs and the size of the servo pulser in use, and the shape/size of the holes and configuration of the internal fluid flow paths.

The servo tips 128 are pressed onto servo face 119 of servo seat 122 by spring 506 and are located radially by shaft 126 and piston compensator 522 and its gaskets. In this manner, servo shaft 126, rotor 125, and servo tips 128 are located to servo seat 122 in such a manner as to allow servo shaft 126 to be rotated relative to the servo seat 122.

FIG. 6A shows a three-dimensional model of some of the parts of this assembly when mated together where in the orientation shown, the servo holes 124 are covered completely by servo tips 128 and no fluid is allowed to flow through. FIG. 6B shown another orientation of the same where the servo shaft 126 has been rotated to an open position and the servo holes 124 are now opened and a fluid pathway is created to allow fluid to flow between outlet chamber 406 outside servo pulser 100 and pulser 62, and servo chamber 440 of pulser 62, the pathway from servo chamber 440, through servo holes 124 in the servo seat 122 and through servo fluid ports 65 in servo valve housing 102.

Rotating a shaft to open and close a hole in this manner is advantageous in many ways. One of these advantages is the ability open and close the servo valve 101 rapidly and completely and thereby creating an unobstructed path for the fluid to flow. In addition, the symmetric nature of the shear valve design allows for the opening and closing of multiple holes simultaneously and thereby doubling or quadrupling the area available for fluid to flow through the servo valve 101. In addition, a predominant number of products in the prior art attempt to achieve such opening and closing of a fluid passage by axially moving the shaft, either through the use of solenoids or lead screws and motors. These methods are unable to fully retract the shaft in a reasonable amount of time and as such are susceptible to having the servo holes obstructed by contaminants in the mud. The invention thus described avoids these problems by opening the servo holes completely and fully and in addition, the rotating action of the servo shaft 126 sweeps and displaces any debris that might be obstructing the servo valve and is able to open and close effectively under the harshest conditions.

An advantage to this apparatus is that openings formed by servo holes 124 may be formed large enough, even given the diametrical limitations imposed by the use of servo pulser 100 inside the internal drilling column 13, so as to not significantly impede the flow of drilling fluid on its way to the bit during normal drilling operations. This may reduce erosion and wear on the holes and surrounding structures that is caused due to the high flow velocities of the drilling mud through smaller holes. The maximum theoretical limit on the ratio of a cross-section of the servo holes 124 to that of the servo seat 122 is 0.5, assuming the holes are fully obstructed in one orientation and fully open in the other. In one embodiment, the cross-sectional ratio is at or above 0.08; in another at or above 0.05; and in another at or above 0.03. In one embodiment, each of the four servo holes 124 is about ¼ inch in diameter, is located symmetrically off-axis with respect to the rotational axis of servo shaft 126 at about a center-to-center distance of 1.4 inch across the centerline of the rotational axis. The ratio of a cross-section of the servo holes 124 to that of the outer diameter of the servo valve 101 is, in one embodiment, about 0.040. Having a larger flow area through a servo valve is also an advantage as it allows greater forces to be imparted to the pulser thus increasing the robustness and reliability of such valves.

Another advantage of using the action of rotating a servo shaft to operate a rotary servo pulser is that it permits the servo valve and servo pulser to be relatively shorter than those in the prior art. A shorter length may allow the MWD tool, as built, to be stiffer and also to not need special flexible members to allow for the curvature of the borehole. In one embodiment, the slenderness ratio of the servo pulser 100 (length/o.d.) is less than 18. In one embodiment, the slenderness ratio of the servo valve 101 (length/o.d.) is less than 2.25 (where the length is the combined installed length of servo seat 122, servo seat retainer 120, and servo shaft 126).

Servo seat 122 and servo tips 128 are preferably made of a hard material to provide significant resistance to erosion and wear caused by the repeated opening and closing of said servo valve 101. Some such materials can be made from cemented ceramics or carbides such as aluminum oxide, silicon carbides, or tungsten carbides. Although such hard materials are generally better in applications, in some embodiments, standard metal or plastic components may be used to reduce manufacturing costs.

Having the edge of a servo tip 128 be sharp where it is in contact with servo seat 122 significantly adds to the cutting and sweeping ability of the servo valve 101. The action of rotating the servo shaft 126 in effect causes the sharp knife-like edge of the servo tip 128 to sweep across the face of the servo seat 122 and thereby cut any contaminants that may be obstructing the servo holes 124. This shearing action is highly desirable in MWD applications where additives and contaminants in the drilling mud may frequently cause jams in some equipment.

Servo shaft 126 is allowed to rotate between two orientations that are controlled by mechanical stops 121 built into servo valve housing 102. Mechanical stops 121 are located radially outward of servo seat 122 and are in contact with, and in a fixed rotational orientation to, servo seat 122. Mechanical stops 121 provide a rotational position that is fixed with respect to servo seat 122. Servo shaft 126 may be made of a material, such as a chrome stainless steel that is more resilient, and shock- and impact-resistant than servo seat 122 and servo tips 128.

FIG. 5 shows an embodiment of the servo valve design where servo holes 124 through servo seat 122 and servo tips 128 are circular in nature. Other embodiments are possible where the number and shapes of servo holes 124 and the shape of servo tips 128 are varied. In one such embodiment (not depicted), the servo holes 124 and servo tips 128 are wedge shaped and the action of rotating the servo shaft opens and closes a fluid passageway whose edges are straight lines. Another such possible embodiment is one where the servo holes 124 and servo tips 128 are of unequal diameter and positioned in such a manner as to allow for the opening and closing of servo holes of varying sizes by reciprocating the rotation of the servo shaft.

Figure 4A:
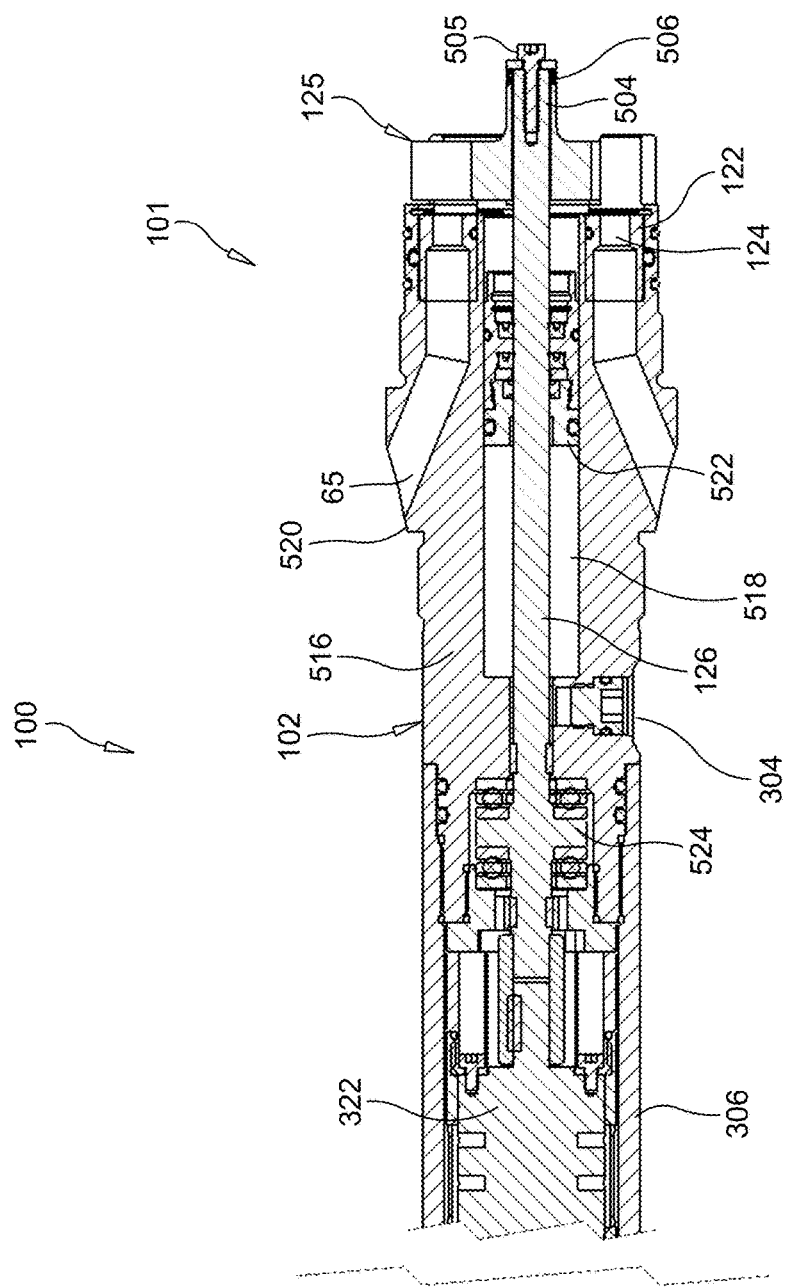
FIGS. 4A through 4D are two-dimensional cross-sectional views of the servo pulser as embodied in FIG. 3.
Figure 4B:
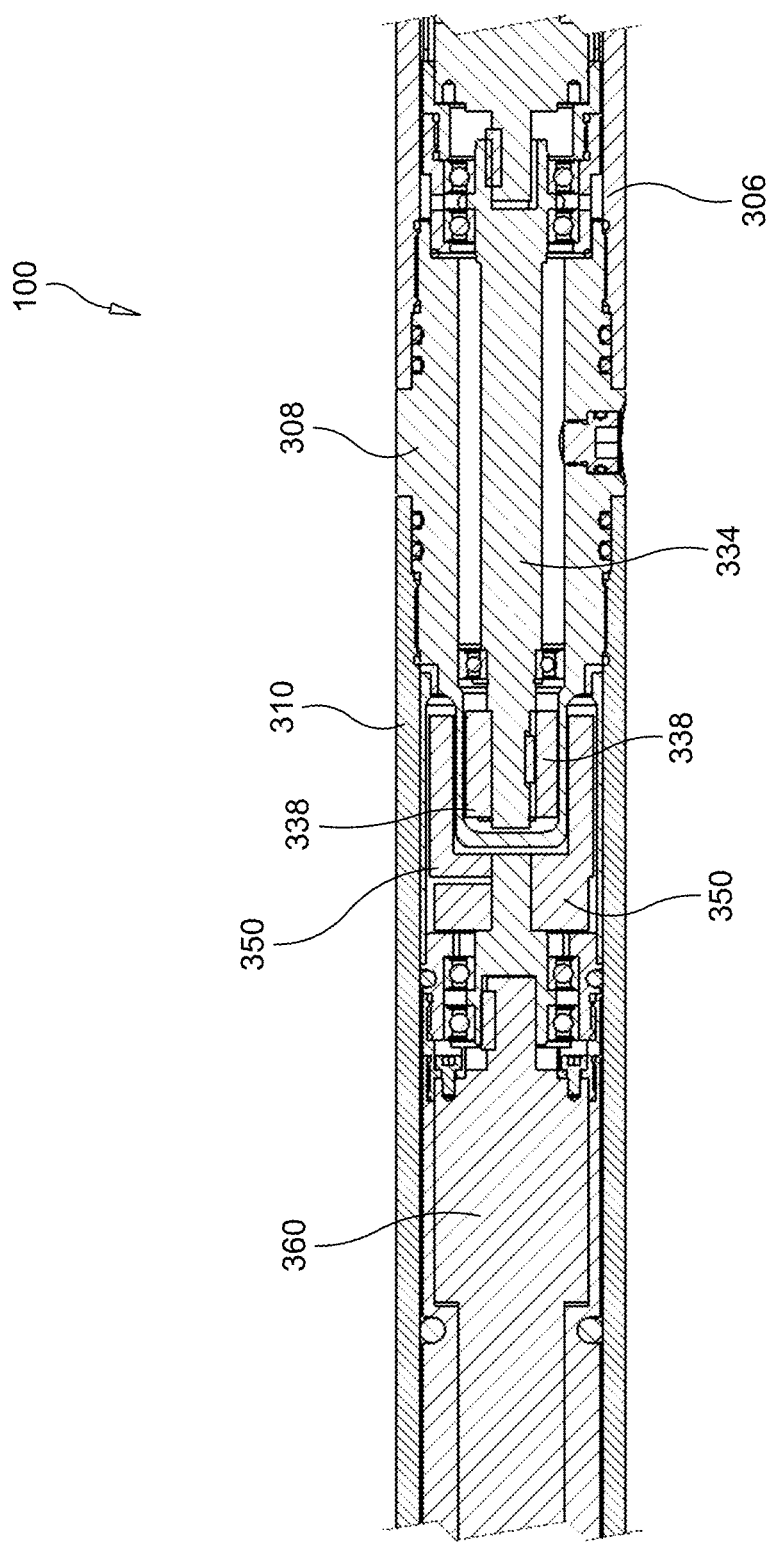
Figure 4C:
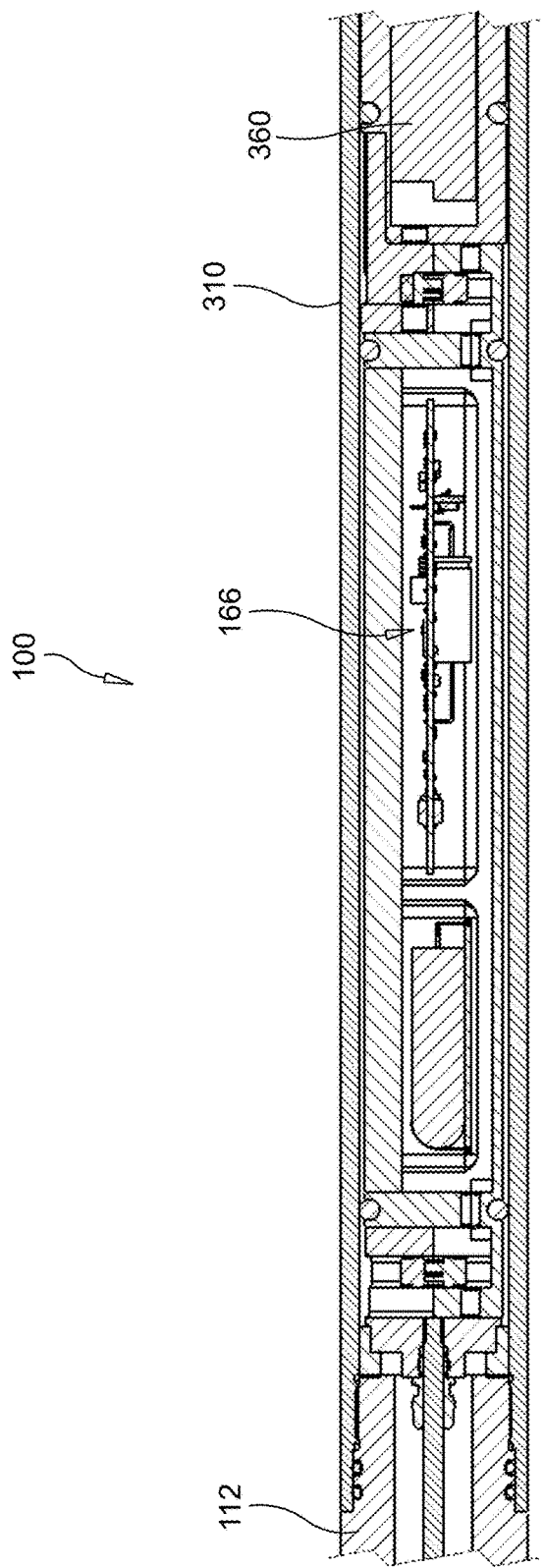
Figure 4D:
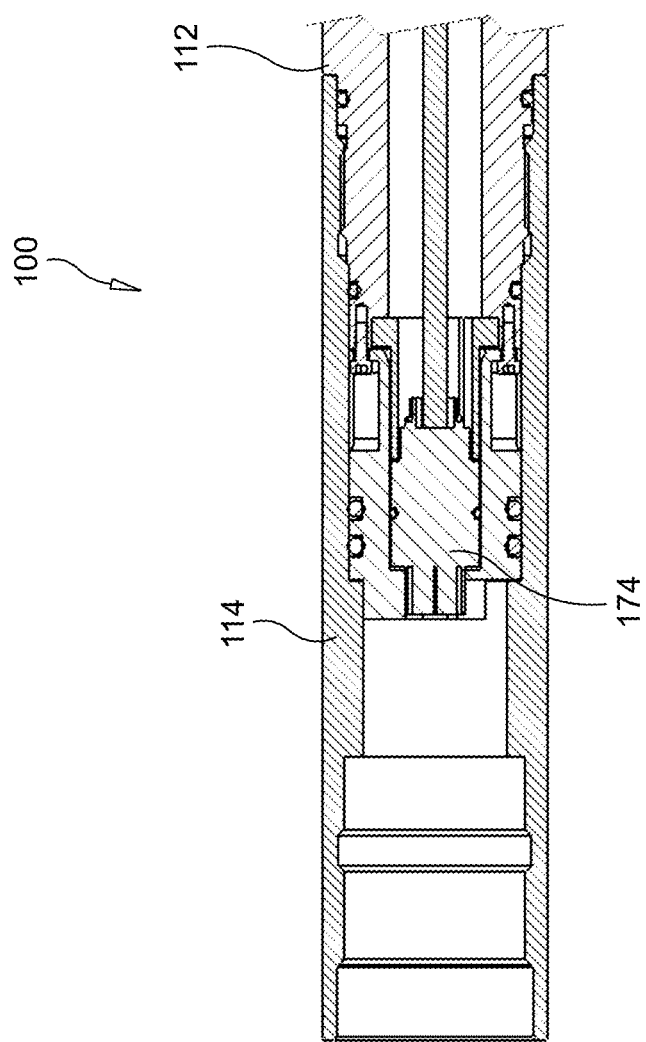

Referring to FIGS. 4A, and 8A and 8D, servo valve 101 in this embodiment is rotated between two different orientations by the rotating action of servo shaft 126.

Turning to FIGS. 4A, 7 and 8A-8D, pulser 62 operates with servo pulser 100 within MWD tool 10. In an embodiment, MWD tool 10 includes casing 403 to which pulser 62 is mounted, and which in turn supports servo pulser 100. Casing 403 includes locking bolt 404 and male joint 407 (which mates with a corresponding female joint above it (not shown)).

In an embodiment, pulser 62 includes longitudinally movable piston/shaft assembly 410, cylinder assembly 430, orifice assembly 450, inlet assembly 470, and upstream assembly 460. Pulser 62 is designed for mud flow passing inlet chamber 405, past/through inlet assembly 470, through upstream assembly 460 and orifice assembly 450 (and through piston/shaft assembly 410, through servo chamber 440, and out fluid ports 65) into outlet chamber 406 and past servo pulser 100.

In an embodiment, inlet assembly 470 comprises lifting knob 472 at the terminal upstream end of the inlet assembly 470, attached to inlet filter 473 downstream thereof. Inlet filter 473 is fixed to radial support 462 of upstream assembly 460, and includes shaft channel 476, in which shaft tip 424 of shaft 412 can slide. Shaft channel 476 is elongated and sufficiently long that shaft tip 424 can travel freely between the full upstream and full downstream stroke positions of shaft 412. Inlet filter 473 contains multiple slits 474 having their inlet sides downstream of their outlet sides on the inside of shaft channel 476.

In an embodiment, upstream assembly 460 comprises radial support 462, which is mounted to casing 403 to support pulser 62. Radial support 462 supports inlet assembly 470 axially and radially in its center, and also allows mud to pass downstream from inlet chamber 405 to poppet chamber 466 via holes 463 located radially outward therefrom, but not around the outside thereof. Poppet chamber 466 is formed outwardly by the cylindrical walls of upstream assembly 460 and downstream by orifice 456 and orifice face 454, and is sufficiently long that poppet 422 can travel freely between the full upstream and full downstream stroke positions of shaft 412. Upstream assembly 460 also includes radial bearing 464 for the upstream end of shaft 412. In an embodiment, that bearing mechanism engages the shaft upstream of the obstruction.

In an embodiment, orifice assembly 450 comprises a constriction 452 extending radially inward from the cylindrical walls of orifice assembly 450 forming a centrally-located orifice 456. Upstream of orifice 456, constriction 452 forms steeply angled face 454, to force fluid to change direction sharply, and a downstream face 457 opening more gently in a contoured shape. Downstream of downstream face 457 the cylindrical walls of orifice assembly 450 form piston chamber 435, which is formed outwardly by the cylindrical walls of orifice assembly 450 and is open to flow past spandrels 444 of cylinder body 442 on its downstream end to outlet chamber 406. Orifice assembly 450 is fitted by a threaded connection within cylinder support body 442.

In an embodiment, piston/shaft assembly 410 is centrally located in inlet assembly 470, cylinder assembly 430, orifice assembly 450, and upstream assembly 460, and connects to servo pulser 101 at its downstream end, and is longitudinally movable therein. Piston/shaft assembly 410 comprises shaft 412 extending from upstream end shaft tip 424 to piston 416. Shaft 412 contains servo fluid channel 414 passing through shaft tip 424 upstream and through piston 416 on the downstream side via shaft outlet 425, thus creating a fluid path connecting mud in shaft channel 476 and in servo chamber 440. Piston 416 has spring face 415 and servo face 417. Piston 416 also includes gasket 418 to provide a seal with cylinder 431 as piston 416 moves within cylinder assembly 430. Shaft assembly 410 also comprises poppet 422, which is placed radially about the exterior of shaft 412. Poppet 422 is roughly conical in shape and includes sloped face 423 which is streamlined in the direction of flow. Poppet 422 may have other shapes as desired so that it blocks or interrupts flow in orifice 456. Axially, poppet 422 is placed such that poppet 422 is upstream of orifice 456 in the full upstream stroke position of shaft/piston assembly 410 and substantially blocking orifice 456 in the full downstream stroke positions of shaft/piston assembly 410. In embodiments, poppet 422 closed positions may be fully within orifice 456, having its widest portion within or mostly within orifice 456, or sufficiently blocking orifice 456 to create enough of a pressure drop in the mud (fluid) flow. In embodiments, poppet 422 open positions may be fully clear of orifice 456, a distance upstream calculated by the radial and length dimensions or fluid flow characteristics, or sufficiently upstream of orifice 456 to create enough of change in pressure drop in the mud (fluid) flow from the closed position. Shaft/piston assembly 410 also comprises inlet shield 426 on the exterior of shaft 412, which has an O.D. larger than the O.D. of shaft 412 and extends with an open end downstream. Inlet shield 426 also has an O.D. slightly larger than the O.D of piston inlet 438, and joins shaft 416 upstream of the terminal portion of piston inlet 438 when shaft/piston assembly 410 is in its full downstream stroke position, and extends downstream sufficiently to cover piston inlet 438 when in the full upstream stroke position.

In an embodiment, cylinder assembly 430 comprises cylinder body 432, enclosing cylinder 431 and spring 437, servo chamber body 433, and cylinder support body 431. Cylinder support body 431 encloses orifice assembly 450 at its upstream end and is fitted within casing 403. Downstream of orifice assembly 450, cylinder support body 442 opens into spandrels 444 within piston chamber 435. Spandrels 444 support cylinder body 432 and are joined by a threaded connection. Cylinder body 432 in turn supports servo chamber body 433 by a threaded connection. At its downstream end, servo chamber body 433 connects to valve body 516. Cylinder body 432 has a narrower upstream I.D. large enough to enclose spring 437, and a larger downstream I.D. to enclose cylinder 431. Spring 437 is compressed between spring face 415 of piston 416 and, at its upstream end, shoulder 436 formed into cylinder body 432. Spring 437 imposes a force on piston 416 in the downstream direction. Together, cylinder body 432 and cylinder 431 define the radial boundaries of cylinder chamber 439, along with piston inlet 438. Piston inlet 438 is an open upstream end of cylinder chamber 439 to provide fluid communication cylinder chamber 435 and to allow shaft 416 to therethrough. Piston inlet 438 is narrower than cylinder body 432 and extends upstream from shoulder 436 along shaft 416. Spring face 415 of piston 416 defines the downstream boundary of cylinder chamber 439.

With respect to a method of using an embodiment of the invention as described above, an MWD tool 10 is described that is capable of measuring desired parameters at the bottom of a borehole during the process of drilling, when desired, is able to telemeter this information to the surface from such a subsurface location using a series of pressure pulses in the drilling fluid where the pressure pulses thus telemetered encode data about these desired parameters which are then subsequently measured at the surface location, detected, decoded and the telemetered information is retrieved, stored, displayed or transmitted further as required.

The MWD tool 10 as described above and with respect to FIGS. 1A and 2 consists of an electrical power source 54 coupled to a controller 56. The controller 56 is attached to a single or a plurality of sensor packages 58 which are used to measure pertinent information at the sub surface location as needed. The MWD tool 10 also consists of servo pulser 64. The controller is also attached to a vibration and rotation sensitive switch 60. This is then attached to a mechanical pulse generating valve called a pulser 62. A pulser 62 creates a pressure pulse in the internal drilling fluid column 13 in response to the actuation of servo pulser 64, to which it is ordinarily mechanically coupled at the end of servo valve housing 102.

The process of commanding the MWD tool 10 to make a measurement of desired parameters and then initiate the telemetry of data may be initiated from the surface. When desired and while in the middle or a drilling process, the driller may transmit a command to the MWD tool 10 by first stopping the rotation of drill string 30 and then upon the lifting of the drill bit 34 from the bottom of the well bore 12 by a few feet, stop the circulation of fluid through the drill string 30 by turning off the circulation of fluid by mud pump 38.

Upon these steps, the drill string 30 and the MWD tool 10 attached to it through drill collars 32 will cease to rotate and move. The driller may at this time wait for a predetermined amount of time to allow the MWD tool 10 to detect the absence of said rotation and vibration and in addition detect the lack of vibrations induced by the flow of fluid past the MWD tool 10.

Upon detection of the lack of vibration and rotation, and upon receiving said signal from the vibration and rotation sensitive switch 60, controller 56 may initiate the process of acquiring any pertinent data from the attached sensor package 58 and prepare this data by encoding it into a format suitable for telemetry through mud pulses. These measurements may include, but are not limited to data indicating the orientation of the MWD tool 10 relative the surface location as pertains to its inclination, direction (azimuth), rotational orientation (toolface) or other physical parameters of interest such as the temperature of the subsurface location, the pressure at the subsurface location, and may further include data pertaining to the geophysical nature of the borehole environment, including the radiation levels, resistivity, porosity or other data that may be pertinent to the effective drilling of the borehole.

At the surface, when the predetermined time has elapsed, the driller may initiate fluid flow through the MWD tool 10 by starting the mud pump 38. The driller may or may not initiate rotation at this point as desired and the MWD tool 10 may transmit varying information depending on the presence or absence of rotation while the fluid flow is on.

The vibration and rotation sensitive flow switch 60 detects the initiation of fluid flow past the MWD tool 10 and may detect the initiation of rotation of the drill string 30 if any such rotation was initiated at the surface. It then signals such information to the controller 56 which in turn waits a predetermined amount of time to allow for the stabilization of fluid flow and the establishment of proper pressures.

When this predetermined delay time has elapsed, the controller 56 may initiate the start of transmission of data to the surface by signaling the servo pulser 64 to operate.

Upon receiving that signal, servo pulser 64 may initiate a sequence of opening and closing movements by oscillating the servo shaft 126, and thus servo valve 101, between an open position and a closed position. Each such open and closing even may be treated as a pair and indicate a pressure pulse of a known width and the allowance of fluid flow through the servo pulser 64 during these open times causes the pulser 62 to engage and close a large valve which in turn restricts fluid flow through the MWD tool 10 and creates a pressure pulse in the fluid column.

Turning to FIGS. 1B, 7 & 8A-8D, pulser 52 uses fluid flow through orifice 456 to create pressure drop in the mud (fluid) flow passing through MWD tool 10 and in the fluid column. The longitudinally movable piston/shaft assembly 410 is responsive to pressure differentials on opposing sides of that assembly to create that movement, and to create changes in the pressure drop across orifice 456 by moving an obstruction in and out of orifice 456. A poppet driven by such a longitudinally movable piston/shaft assembly 410 may sometimes be known as a piston-balance system, in that steady-state flow-induced pressures, and thus forces, may hold the system at a balance point. Poppet 422 provides the obstruction. Cylinder assembly 430 applies a biasing force to hold the valve in the closed position absent hydraulic forces sufficient to open it or keep it open. Pressure differentials across piston 416, and the biasing force, drive piston/shaft assembly 410 and the position of poppet 422. Those differentials are created by relative restrictions on flow, and thus pressure drops, created by the orifice 456 and poppet 422, by servo fluid channel 414, and by the opening and closing of servo valve 101. The details of operation of the pulser can be described in the following sequence, with particular reference to FIGS. 8A-8D (in which elements of pulser 62 are numbered in FIG. 8A, and those of servo pulser 100 in FIG. 8B, and only parts of interest are renumbered in the other figures).

In FIG. 8A, MWD tool 10 is shown with both pulser 62 and servo pulser 100 in closed positions. Main valve pulser 62 is at the full downstream stroke position, in which piston 416 reaches its farthest downstream position. Piston 416 has been forced by spring 437 to that position because its force has overcome any hydraulic forces. This is the default state, and one instance in which this state occurs is if mud pump 38 is off. In that default state, no substantial hydraulic forces are applied (other than those due to mud pressure due to depth), and movement of servo valve 101 causes no movement of the main valve pulser 62.

In FIG. 8B, MWD tool 10 is also shown with both pulser 62 and servo pulser 100 in closed positions. Main valve pulser 62 is at the full downstream stroke position, in which piston 416 reaches its farthest downstream position. This state may occur as a starting state when mud pump 38 is first turned on, with servo valve 101 closed. This state may also occur as a reset state, after pulser 62 has created a pressure pulse in the fluid column, and servo valve 101 is closed to cause pulser 62 to reset. In the former case, when mud pump 38 is turned on, a pressure imbalance is created across spring face 415 and servo face 417 of piston 416. This imbalance is created by the pressure drop across orifice 456, as affected by the positioning of poppet 422, and causes piston 416 and thus shaft/piston assembly 410, to rise, and open the valve. Functionally, servo face 417 sees a pressure P1 in servo chamber 440, which reflects the pressure in inlet chamber 405, upstream of orifice 456, while spring face 415 sees a pressure P2 in cylinder chamber 439, which reflects the pressure in piston chamber 435 downstream of orifice 456. These reflect fluid pathways provided between these locations, respectively, by shaft channel 476, shaft tip 424, servo fluid channel 414 and shaft outlet 425, and the closed position of servo valve 101, and by piston inlet 438.

As the pump flow rate builds, causing mud flow downstream toward servo pulser 100, the closed state of pulser 62 causes causing P2 to drop, due to the larger pressure drop resulting from the constriction of orifice 456 by poppet 422. This causes the difference between P1 and P2 to increase. In addition, poppet 422 (and to a lesser extent inlet shield 426) experience a net downstream force resulting from high upstream surface pressures on the leading face and lower downstream pressures on the downstream or trailing face due to fluid flow ($F_{flow}$). These pressure values each apply a force (F1, F2, respectively, based on piston area) to piston 416 in opposing directions (where the force applied by spring 437, $F_{spring}$, and the net downstream force due to fluid flow, $F_{flow}$, are both additive to P2). When P1 is sufficiently greater than P2 (that is F1>F2+$F_{spring-uncompressed}$+$F_{flow}$), it causes piston 416 to move in the upstream direction (rise), thus compressing spring 437. This rise lifts piston/shaft assembly 410 and eventually moves poppet 422 out of orifice 456. As it does so, the pressure drop across orifice 456 becomes smaller, P2 rises, and the difference between P1 and P2 decreases.

Turning to FIG. 8C, at a stable balance point of piston/shaft assembly 410 (between the fully open and closed position), P2 has increased to P2A, where the hydraulic forces and spring forces are balanced (F1=F2A+$F_{spring-compressed}$+$F_{flow}$). Roughly, compressive force of the spring at the stable point can be calculated as: ($F_{spring-compressed}$={P2A−P1}*$A_{piston}$)(ignoring other hydraulic forces). Due to frictional losses, and in high flow conditions, this stable position may be at the upper extremity, causing the shaft to bottom out in its full upstream stroke position. All force calculations ignore friction and other losses, which can be important in certain cases. This is the "primed state" of main valve pulser 62.

In the primed state, pulser 62 remain in an open position and servo pulser 100 remains in a closed position, with mud pump 38 remaining on. The hydraulic forces and spring forces are balanced, and piston/shaft assembly 410 is at a stable balance point. In the example shown in FIG. 8C, piston/shaft assembly 410 is shown at maximum upstream translation, the full upstream stroke position, though the primed position does not require full upstream stroke, although achieving proper pressure pulse generation may require that, in the primed position, poppet 422 be upstream of and outside orifice 456.

Turning to FIG. 8D, from the primed state, servo valve 101 is opened as described above. When servo valve 101 is opened, the flow path described above corresponding to P1 changes. Inlet chamber 405, upstream of orifice 456, was formerly connected only to servo chamber 440, via shaft channel 476, shaft tip 424, servo fluid channel 414, and shaft outlet 425, and had no net flow (as it is a dead end). Opening servo valve 101 extends that flow path to outlet chamber 406 and permits net flow by exposing servo holes 124 to servo fluid ports 65. A net downstream fluid flow results, as the pressure difference is roughly P1–P2. This reduces the pressure in servo chamber 440 and on servo face 417 of piston 416. Thus, functionally, servo face 417 now sees pressure P1A in servo chamber 440, which reflects a reduction of pressure in inlet chamber 405, upstream of orifice 456. This new pressure (P1A) can be roughly calculated as P1 less the pressure drop net caused by fluid flow between inlet chamber 405 and servo chamber 440, largely in shaft tip 424, but also including servo fluid channel 414 and across inlet filter 473 (P1A=P1−$\Delta P_{servo}$). The loss across the shaft tip can be calculated roughly based on the total flow areas of the flow paths on the outside and inside of shaft 414.

Opening servo valve 101 also changes the pressure on spring face 415, by permitting some flow to bypass orifice 456 (via servo valve 101) and thus slightly reducing net flow therethrough and the pressure drop thereacross. Reducing that pressure drop means the pressure in cylinder chamber 435 is now increased slightly from P2A to P2B. However, losses through servo valve 101 are small or minimal due to the large total flow area through servo holes 124, and P1A can be estimated to be just slightly higher than P2B. Thus, the balanced hydraulic forces and spring forces (F1=F2A+$F_{spring-compressed}$+$F_{flow}$) now become unbalanced (F1A<F2B+$F_{spring-compressed}$+$F_{flow}$), in the downstream direction, where some of the net force derives from the compressed state of spring 437 in the primed state. Here, flow-induced forces on the piston/shaft assembly (such as poppet 422 and inlet shield 426) assist in closing main valve pulser 62.

The net downward force on piston 416 and piston/shaft assembly 410 causes them to translate downstream, causing poppet 422 to move toward orifice 456. And at some point during this downstream (closing) motion, poppet 422 enters orifice 456 sufficiently to cause the pressure drop thereacross to increase and then to increase dramatically as it approaches the closed position. As it does so, P2B decreases substantially resulting in a greater pressure differential between inlet chamber 405 and outlet chamber 406, and increased flow through those structures causing an increase in $\Delta P_{servo}$. This causes a reduction in P1A as P2B drops. The increasing pressure drop across orifice 456, however, causes $F_{flow}$ to increase, as the net downstream force experienced by poppet 422 rises due to high upstream surface pressures F1 and lower downstream pressure (approaching F2B) due to fluid flow through orifice 456. This causes an increased pressure imbalance in the downstream direction (F1A<<F2B+$F_{spring-compressed}$+$F_{flow}$), even as the force supplied by spring 437 drops. This net imbalance causes a positive feedback loop as it further closes pulser 62 and increases the pressure drop across orifice 456, causing $F_{flow}$ to rise further as the downstream side of poppet 422 enters orifice 456 fully. This causes the main valve to slam down, forcing poppet 422 fully into orifice 456 and causing a pressure pulse in the drilling fluid. In other embodiments, poppet 422 may reach a closed position when partially in orifice 456. In this state, immediately after pulser 62 slams down, piston/shaft assembly 410 is shown as in FIG. 8B, but servo pulser 100 remains open as shown in FIG. 8D.

Then servo valve 101 is closed, and servo pulser 100 and pulser 62 revert to the reset state shown in FIG. 8B. Pulser 62 then passes through the priming process again to reach the primed state shown in FIG. 8C.

Upon receiving that signal, in another embodiment, servo pulser 64 may operate by rotating servo valve 101 between two, or more, rotational orientations. A first orientation may be one in which a passageway for fluid, such as servo holes 124, is substantially obstructed, and a second rotational orientation may be one in which they are substantially unobstructed. In other embodiments, the first orientation may include sealing the fluid passageway, or additional orientations. Sealing a fluid passageway may include rotating servo shaft 126 to such a first orientation by rotating the input end of servo valve 101. In one embodiment, rotating servo shaft 126 rotates a portion thereof to obstruct one or more fluid passageways. That portion may include one or more tips extending axially from the obstructing portion. Substantially obstructing a fluid passageway may include rotating the input end of servo valve 101 to rotate one or more tips 128 to seal servo holes 124.

Servo valve 101 may stop rotation of the servo pulser 64 at one or more orientations by a part of the servo pulser 64 contacting stopping structures. These structures may be in a fixed rotational orientation to fluid passages in servo pulser 64. In one embodiment, the structures are indirect contact with servo seat 122 and are in a fixed rotational orientation to servo holes 124 in servo seat 122. In one embodiment, rotation is stopped by servo shaft 126 contacting mechanical stops 121. Rotation of servo shaft 126 may be stopped by radially-extending portions thereof contacting a structure located radially outward of servo seat 122. Rotation of servo shaft 126 may be stopped by one or more portions thereof contacting an extension of a structure in contact with the servo seat 122, one example of which are mechanical stops 121.

Figure 9:
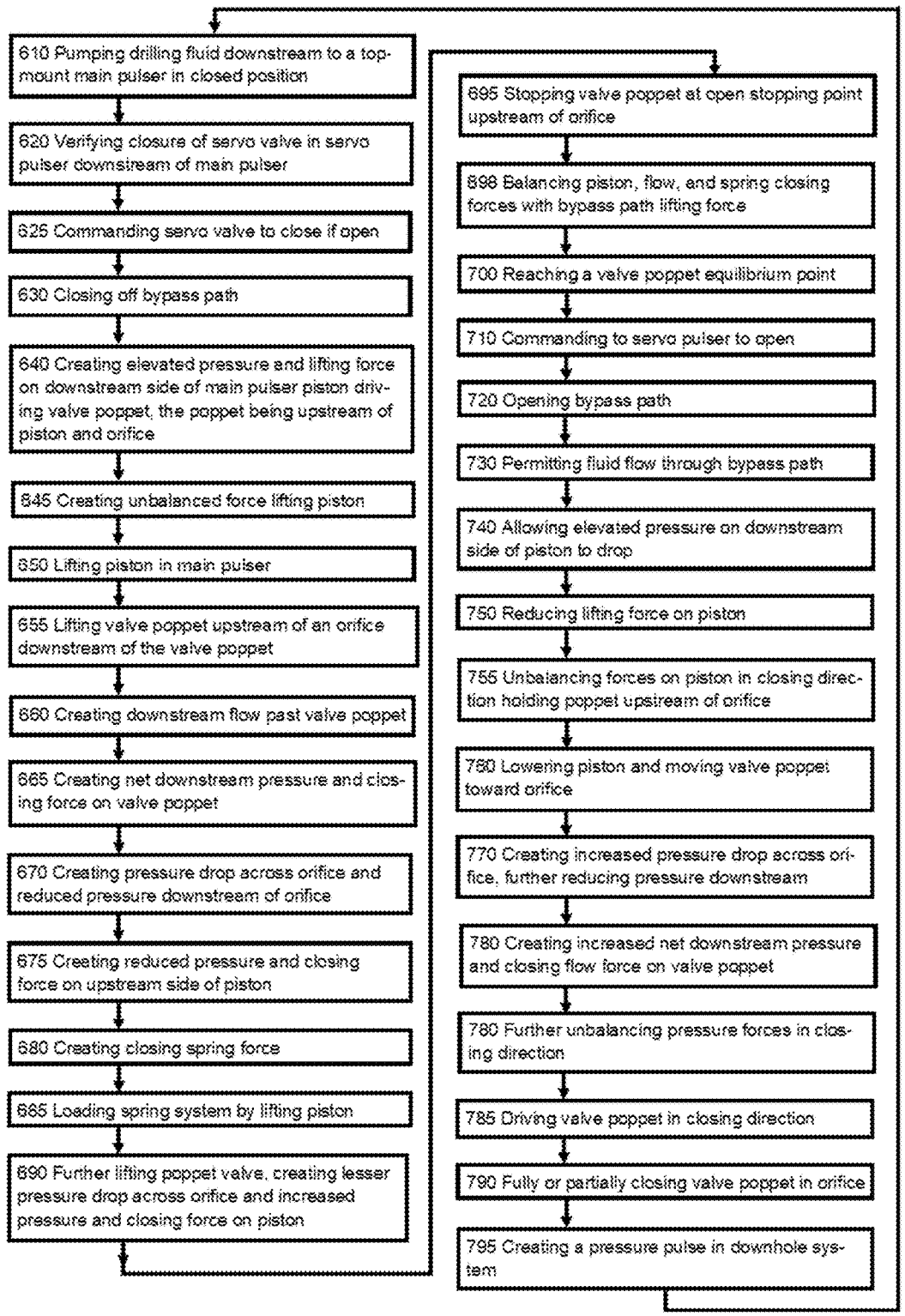
FIG. 9 describes a method of operation of an embodiment of the pulser system.

Turning to FIG. 9, a method of an embodiment of the invention includes the following steps. Step 610 is pumping drilling fluid downstream to a top-mount main pulser in a closed position. Step 620 is verifying a servo valve in an associated servo pulser located downstream of the main pulser is closed. Step 625 is issuing a command to the associated servo valve to close if opened. Step 630 is closing off the bypass path using the associated servo valve, wherein the bypass path upstream of the servo pulser has no valve. Step 640 is creating an elevated pressure and lifting force on the downstream side of a piston in the main pulser driving a valve poppet located upstream thereof in the main pulser, and located upstream of an orifice in the main pulser. Step 645 is creating an unbalanced force tending to raise the piston in the upstream direction. Step 650 is lifting (moving in the upstream direction) the piston in the main pulser. Step 655 is lifting the valve poppet upstream of an orifice located downstream of the valve poppet. Step 660 is creating downstream flow past the valve poppet and through the orifice. Step 665 is creating a net downstream pressure and closing force resulting from flow past and net pressures the valve poppet. Step 670 is creating a pressure drop across the orifice and reduced pressure downstream of the orifice. Step 675 is creating a reduced pressure and closing force on the upstream side of the piston driving the valve poppet. Step 680 is creating a closing spring force in a spring system in the main pulser. Step 685 is loading the spring system by lifting the piston. Step 690 is further lifting the poppet valve, creating a lesser pressure drop across the orifice and an increased pressure and closing force on the upstream side of the piston driving the valve poppet. Step 695 is the valve poppet reaching an open stopping point upstream of the orifice. Step 698 is the low pressure fluid flow (orifice flow) closing force, the flow closing force, and the spring closing force balancing the bypass path lifting force. In an alternative embodiment, forces balance out when a positive stop is reached creating a further force in the downstream direction. Step 700 is the valve poppet reaching an equilibrium point.

Step 710 is issuing a command to the associated servo pulser downstream of the main pulser to open. Step 720 is opening the bypass path using the servo valve, wherein the bypass path upstream of the servo pulser has no valve. Step 730 is permitting fluid flow through the bypass path through the servo pulser. Step 740 is allowing the elevated pressure on the downstream side of the piston to drop. Step 750 is reducing the lifting force on the downstream side of the piston. Step 755 is unbalancing (in a closing direction) the forces holding the piston in position that held the poppet in an open point upstream of the orifice. Step 760 is lowering (moving in the downstream direction) the piston thereby moving the valve poppet toward the orifice. Step 770 is creating an increased pressure drop across the orifice and further reduced pressure downstream of the orifice, which is located downstream of the valve poppet. Step 780 is creating an increased net downstream pressure and closing force resulting from flow past the valve poppet. Step 780 is further unbalancing the pressure forces in the closing direction. Step 785 is driving the valve poppet in the closing (downstream) direction toward the orifice. Step 790 is fully or partially closing the valve poppet in the orifice. Step 795 is creating a pressure pulse in the downhole system. After the end of the pulse, the system is then primed and may be restarted at step 610.

The invention claimed is:

1. A transmitter assembly for a mud pulse telemetry MWD system for operation in an environment including a drilling fluid flow and an upstream direction and a downstream direction defined by the flow, comprising;
   a mud pulse telemetry main pulser, comprising;
      a main orifice;
      a movable obstruction to drilling fluid flow;
      said obstruction located upstream of said main orifice; and
      a piston;
      said piston connected to said obstruction; and
      said piston located downstream of said main orifice; and
      a first bypass conduit defining a sole fluid flow path within said main pulser by-passing said orifice;
   wherein said first bypass conduit has no valve; and
   wherein a position of the obstruction is affected by a sum of pressure-induced forces on said piston caused by said drilling fluid flow.

2. The transmitter assembly of claim 1:
   said orifice and obstruction cooperating to affect fluid flow through the pulser; and
   said main pulser further comprising a shaft assembly connected to said piston to said obstruction; and
   said first bypass conduit passing through said shaft assembly.

3. The transmitter assembly of claim 1, further comprising:
   a servo pulser;
   said servo pulser being positioned downstream of said main pulser.

4. The transmitter assembly of claim 3:
   said servo pulser further comprising:
      a second bypass conduit, hydraulically connected to said first bypass conduit; and
      a servo valve for enabling and disabling fluid flow through said second bypass conduit;
   wherein said second bypass conduit provides a single fluid flow outlet for said first bypass conduit.

5. The transmitter assembly of claim 3, further comprising:
   a second fluid flow path through said servo pulser;
   said second fluid flow path hydraulically connected to said first bypass conduit;
   said second fluid flow path controlled by a single control valve;
   said servo pulser comprising said single control valve.

6. The transmitter assembly of claim 1, further comprising:
   wherein fluid flow past the obstruction creates a downstream force on said obstruction urging said obstruction to close with respect to said orifice.

7. The transmitter assembly of claim 6, further comprising:
   wherein fluid flow downstream into said bypass conduit creates an upstream force on said piston urging said obstruction to open with respect to said orifice.

8. The transmitter assembly of claim 6:
   said main pulser further comprising a biasing mechanism creating a downstream force urging said obstruction to close with respect to said orifice.

9. The transmitter assembly of claim 1, further comprising:
   a servo pulser;
   said servo pulser comprising a rotary shear valve.

10. A method of transmitting a mud pressure pulse in a pulse telemetry MWD system, comprising:
pumping drilling fluid downstream to a mud pulse telemetry main pulser,
said main pulser comprising;
  a main orifice;
  a movable obstruction to drilling fluid flow;
  said obstruction located upstream of said main orifice; and
  a piston;
  said piston connected to said obstruction; and
  said piston located downstream of said main orifice; and
  a bypass conduit defining a sole fluid flow path in said main pulser by-passing said orifice;
  said bypass conduit having no valve; and
affecting a position of the obstruction by a sum of pressure-induced forces on said piston caused by said drilling fluid flow.

11. The method of claim 10:
commanding a servo pulser to operate a servo valve;
said servo pulser being positioned downstream of said main pulser;
said commanding step further comprising opening the servo valve;
said servo valve configured to control flow through said bypass conduit.

12. The method of claim 11:
said servo pulser comprising:
  a second by-pass conduit, hydraulically connected to said first bypass conduit in said main pulser;
  the servo valve for enabling and disabling fluid flow through said second bypass conduit; and
  wherein said second bypass conduit provides a single fluid flow outlet for said first bypass conduit in said main pulser.

13. The method of claim 11:
said servo pulser comprising a second fluid flow path therethrough;
  said second fluid flow path hydraulically connected to said bypass conduit;
  said second fluid flow path controlled by a single control valve; and
  said servo valve comprising said single control valve; and
said commanding step further comprising opening the servo valve; and
reducing an upstream force acting on said obstruction thereby unbalancing forces holding the obstruction in an open position upstream of the orifice.

14. The method of claim 10:
reducing an upstream force on a downstream side of the piston thereby unbalancing forces holding the obstruction in an open position upstream of the orifice.

15. The method of claim 10:
said pumping step comprising said drilling fluid creating a closing force on said obstruction;
wherein said creating step comprises said flow creating a higher pressure zone on an upstream face of said obstruction and a lower pressure zone on a downstream face of said obstruction urging said obstruction to close with respect to said orifice.

16. The method of claim 10, further comprising:
said pumping step comprising said drilling fluid creating a closing force on said obstruction; and
moving the obstruction in a downstream direction toward the orifice;
wherein said closing force on said obstruction increases during at least a portion of said moving step.

17. The method of claim 10:
said main pulser further comprising a biasing mechanism creating a downstream force urging said obstruction to close with respect to said orifice.

18. The method of claim 10, further comprising:
commanding a servo pulser to operate a servo valve;
said operating step comprising operating a rotary shear valve.

19. The method of claim 10, further comprising:
moving the obstruction in a downstream direction toward the orifice;
said moving step comprising substantially closing said orifice with said obstruction.

20. A transmitter assembly for a mud pulse telemetry MWD system for operation in an environment including a drilling fluid flow and an upstream direction and a downstream direction defined by the flow, comprising:
a main pulser, comprising;
  a main orifice positioned within said pulser; and
  an obstruction movably positioned within said pulser;
  said obstruction being positioned upstream of said orifice; and
  a first bypass conduit defining a fluid flow path within said main pulser by-passing said orifice;
  wherein said first bypass conduit has no valve; and
  wherein said first bypass conduit passes substantially down a center of said orifice; and
a servo pulser;
said servo pulser being positioned downstream of the said main pulser.

21. The transmitter assembly of claim 20:
said servo pulser comprising a rotary shear valve.

22. The transmitter assembly of claim 20:
said servo pulser comprising:
  a second bypass conduit, hydraulically connected to said first bypass conduit;
  a servo valve for enabling and disabling fluid flow through said second bypass conduit; and
  wherein said second bypass conduit provides a single fluid flow outlet for said first bypass conduit.

23. The transmitter assembly of claim 20:
said servo pulser comprising:
  a second fluid flow path through said servo pulser;
    said second fluid flow path hydraulically connected to said first bypass conduit;
    said second fluid flow path controlled by a single control valve; and
  a servo valve comprising said single control valve.

24. The transmitter assembly of claim 20 further comprising:
wherein fluid flow past the obstruction creates a downstream force on said obstruction urging said obstruction to close with respect to said orifice; and
wherein fluid flow downstream into said first bypass conduit creates an upstream force acting on said obstruction urging said obstruction to open with respect to said orifice.

25. A method of transmitting a mud pressure pulse in a pulse telemetry MWD system, comprising:
pumping drilling fluid downstream to a main pulser,
said main pulser comprising;
  a main orifice positioned within said pulser; and
  an obstruction movably positioned within said pulser;
  said obstruction being positioned upstream of said orifice; and a bypass conduit defining a fluid flow path in said main pulser by-passing said orifice;

said bypass conduit having no valve; and said bypass conduit passing substantially down a center of said orifice; and commanding a servo pulser to operate a servo valve;

said servo pulser being positioned downstream of said main pulser.

26. The method of claim 25:

said commanding step further comprising opening the servo valve configured to control flow through said bypass conduit.

27. The method of claim 25:

said operating step comprising operating a rotary shear valve.

28. The method of claim 25:

said servo pulser comprising:
- a second bypass conduit, hydraulically connected to said bypass conduit in said main pulser;
- a servo valve for enabling and disabling fluid flow through said second bypass conduit; and
- wherein said second bypass conduit provides a single fluid flow outlet for said bypass conduit in said main pulser.

29. The method of claim 25:

said servo pulser comprising a second fluid flow path therethrough;

said second fluid flow path hydraulically connected to said bypass conduit;

said second fluid flow path controlled by a single control valve; and said servo valve comprising said single control valve; and said commanding step further comprising opening the servo valve; and reducing an upstream force acting on said obstruction thereby unbalancing forces holding the obstruction in an open position upstream of the orifice.

30. The method of claim 25:

said pumping step comprising said drilling fluid creating a higher pressure zone on an upstream face of said obstruction and a lower pressure zone on a downstream face of said obstruction urging said obstruction to close with respect to said orifice;

said commanding step further comprising opening the servo valve, said opening step comprising;
- opening a second fluid flow path in said servo pulser permitting fluid to escape from said bypass conduit; and
- reducing an upstream force acting on said obstruction that urged said obstruction to remain open with respect to said orifice.

* * * * *